United States Patent
Nishi et al.

(10) Patent No.: US 6,768,573 B1
(45) Date of Patent: Jul. 27, 2004

(54) POLARIZATION CONTROL OPTICAL SPACE SWITCH

(75) Inventors: Tetsuya Nishi, Kawasaki (JP); Takuji Maeda, Kawasaki (JP); Satoshi Kuroyanagi, Kawasaki (JP); Tsuyoshi Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/631,355

(22) Filed: Aug. 2, 2000

Related U.S. Application Data

(62) Division of application No. 08/200,657, filed on Feb. 23, 1994, now Pat. No. 6,134,031.

(30) Foreign Application Priority Data

| Feb. 23, 1993 | (JP) | ............................................... 5-33178 |
| Mar. 4, 1993 | (JP) | ............................................... 5-69211 |
| May 26, 1993 | (JP) | ............................................. 5-124010 |
| Feb. 9, 1994 | (JP) | ............................................... 6-15544 |

(51) Int. Cl.[7] ............................. G02F 1/01; G02F 1/29; G02B 26/08; H04J 14/00; H04J 14/06
(52) U.S. Cl. ...................... 359/250; 359/254; 359/256; 359/259; 359/301; 359/304; 359/316; 359/320; 398/55; 398/57; 398/65; 385/16
(58) Field of Search ............................... 359/301, 320, 359/484, 495, 497, 246, 247, 250, 251, 254, 256, 259, 302, 303, 304, 316; 398/45, 55, 57, 65; 385/16, 17

(56) References Cited

U.S. PATENT DOCUMENTS

| 3,391,970 | A | * | 7/1968 | Box ............................ 359/302 |
| 3,391,972 | A | * | 7/1968 | Harris et al. ................. 359/303 |
| 3,536,921 | A | * | 10/1970 | Caulfield .................... 359/250 |
| 3,658,409 | A | * | 4/1972 | Shimbo et al. ............. 359/303 |
| 3,667,828 | A | * | 6/1972 | Kojima et al. .............. 359/316 |
| 4,410,238 | A | | 10/1983 | Hanson ....................... 359/39 |
| 4,461,543 | A | * | 7/1984 | McMahon |
| 4,474,434 | A | | 10/1984 | Carlsen et al. ................. 385/2 |
| 4,516,837 | A | | 5/1985 | Soref et al. .................... 385/16 |
| 4,822,124 | A | * | 4/1989 | Suzuki |
| 4,837,855 | A | | 6/1989 | Hajikano et al. |
| 4,948,229 | A | | 8/1990 | Soref .......................... 385/16 |
| 5,013,140 | A | | 5/1991 | Healey et al. ................ 359/39 |
| 5,076,672 | A | | 12/1991 | Tsuda et al. ................ 359/244 |
| 5,077,483 | A | * | 12/1991 | Cloonan et al. ............. 385/16 |
| 5,153,757 | A | | 10/1992 | Cloonan et al. ............. 385/16 |
| 5,162,944 | A | | 11/1992 | Yamamoto et al. ......... 359/251 |
| 5,317,445 | A | | 5/1994 | DeJule et al. |
| 5,317,658 | A | | 5/1994 | Bereland et al. ............. 385/16 |
| 5,319,483 | A | | 6/1994 | Krasanski et al. .......... 359/484 |
| 5,381,250 | A | | 1/1995 | Meadows ................... 359/495 |
| 6,134,031 | A | * | 10/2000 | Nishi et al. ................ 359/254 |

FOREIGN PATENT DOCUMENTS

JP        6-66982        1/1987

* cited by examiner

Primary Examiner—Ricky D. Shafer
(74) Attorney, Agent, or Firm—Staas & Halsey LLP.

(57) ABSTRACT

The present invention is directed to an optical space switch accommodating a plurality of input light paths and output light paths. The optical space switch comprises a plurality of polarization control optical switches, each consisting essentially of: polarization control means having elements, one for each input light path, for rotating through 90° the polarizing direction of light information incident from each input light path or otherwise retaining the polarizing direction thereof for output; and a light path routing element for routing the light path for the light information output from the polarization control means in accordance with the polarizing direction of the light information. These polarization control optical switches are arranged in a matrix pattern or coupled in cascade to implement a polarization control optical space switch.

9 Claims, 31 Drawing Sheets

POLARIZATION CONTROL OPTICAL SPACE SWITCH

This application is a divisional of application Ser. No. 08/200,657, filed Feb. 23, 1994, now U.S. Pat. No. 6,134,031.

BACKGROUND OF THE INVENTION

(1) Field of the Invention

The present invention relates to an optical space switch that is used to set up a path between a fiber-optic transmission path on the incident side and a fiber-optic transmission path on the output side.

(2) Description of the Prior Art

With recent advances in the development of information transmission systems using optical fibers as information transmission paths, the need has been increasing particularly for a polarization control optical space switch that performs switching to direct light information in the form of a light signal, without converting it into an electrical signal, from an input fiber-optic transmission path to a selected output fiber-optic transmission path.

FIG. 31 is a diagram showing the configuration of a prior art polarization control optical space switch.

This polarization control optical space switch has n inputs and n outputs, and performs light path switching for light information which entered as p-polarized light.

The polarization control optical space switch shown comprises $n^2$ switch elements, SW11–SWnn, arranged as a matrix of n rows and n columns.

On the input side of this polarization control optical space switch are arranged n input fibers Ii (i=1, 2, ..., n). Furthermore, a lens L and a polarizer Pi (i=1, 2, ..., n) are arranged between each input fiber Ii and each input light path to the polarization control optical space switch.

The lens L is a converging lens that converges the light information emerging from the input fiber.

The polarizer Pi is an element that allows light information which entered as p-polarized light to pass through it.

Lenses L, the number of which is equal to the number of output light paths, are arranged on the output side of the polarization control optical space switch. On the output side of the lenses L, there are arranged n output fibers Oi (i=1, 2, 3, ..., n), one for each lens L.

The light information output from the input fiber Ii is converged by the lens L and enters the polarizer Pi.

If the incident light information is p-polarized light, the light information is allowed to pass through the polarizer Pi and enters the first row of switch elements SWi1 (i=1, 2, ... n).

Light information output from the n-th column of switch elements SWnj (j=1, 2, ..., n) is converged by the lens L and enters the output fiber Oi.

In the above configuration, each switch element SWij is constructed from a combination of a polarization splitter and two polarization control elements formed from liquid crystals. The two polarization control elements are placed on the incident and reflected sides, respectively, of the polarization splitter.

The polarization splitter transmits incident light information in the rectilinear forward direction when its polarizing direction is p-polarization, and reflects incident light information in a vertical direction when its polarizing direction is s-polarization.

The structure is such that an external voltage can be applied as desired to the polarization control elements.

The polarization control elements each function to retain the polarizing direction of the incident light information when no voltage is applied, and to rotate the polarizing direction of the incident light information through $\pi/2$ when voltage is applied.

For example, consider a case in which the light information incident on the switch element SW11 is to be passed to the switch element SW12. Since the light information incident on the switch element SW11 is p-polarized light, voltage is not applied to the polarization control element on the incident side. In this case, the light information incident on the switch element SW11 first enters the polarization control element on the incident side. The light information with its p-polarization state retained is passed through the polarization control element on the incident side and enters the polarization splitter.

The polarization splitter transmits the incident p-polarized light in the rectilinear forward direction for input to the switch element SW12.

On the other hand, if the light information incident on the switch element SW11 is to be directed to the switch element SW21, voltage is applied to the polarization control elements on both the incident and reflected sides. In this case, the p-polarized light incident on the switch element SW11 first enters the polarization control element on the incident side. The polarization control element on the incident side then rotates the incident p-polarized light to convert it into s-polarized light which is input into the polarization splitter.

The polarization splitter reflects the incident s-polarized light vertically downward for input into the polarization control element on the reflected side.

The polarization control element on the reflected side rotates the incident s-polarized light to convert it into p-polarized light which is input to the switch element SW21.

The switch element SW21 then allows the p-polarized light incident from the switch element SW11 to pass through it, so that the light is directed to the switch element SW31. The p-polarized light is thus input to the switch element SWn1.

The switch element SWn1 transmits the incident p-polarized light in the rectilinear forward direction, directing the light to the output fiber O1. Thus, by applying a voltage to the polarization control elements on both the incident and reflected sides of the switch element SW11, a path is set up between the input fiber I1 and the output fiber O1.

By externally controlling the polarization control elements of each switch element SWij in this manner, a path can be set up between a desired input fiber and output fiber.

In the prior art polarization control optical space switch, since each switch element is formed at an intersection of the matrix, two polarization control elements must be controlled per switch element when setting a connection path.

The prior art polarization control optical space switch has the further problem that the number of switch elements for light to pass through varies depending on the path to be set, resulting in differences in the transmission loss and crosstalk from path to path.

In view of the above problems, it is an object of the present invention to provide a polarization control optical space switch wherein the number of switch elements for light to pass through is always the same independently of the path to be set, thus suppressing differences in the transmission loss and crosstalk.

SUMMARY OF THE INVENTION

The polarization control optical space switch of the present invention comprises a combination of a plurality of polarization control optical switches.

Each polarization control optical switch comprises a polarization control means and a light path routing element.

The polarization control means contains elements, one for each light path, for rotating the polarizing direction of input light through 90° or otherwise retaining it with no introduction of rotation.

The light path routing element routes the light information output from the polarization control means in accordance with the polarizing direction of the light information.

More particularly, the polarization control means is constructed from a combination of: an element which, when voltage is applied, rotates the polarizing direction of input light information through 90°, and when voltage is applied, does not rotate the polarizing direction of input light information; and an element which, when voltage is applied, does not rotate the polarizing direction of input light information, and when voltage is not applied, rotates the polarizing direction of input light information through 90°.

In each polarization control optical switch, a light signal incident along an input light path is first entered into the polarization control means.

The polarization control means rotates the polarizing direction of the light information through 90° or does not rotate it, depending on an external control signal.

The light information output from the polarization control means enters the light path routing element.

The light path routing element transmits the incident light information in the rectilinear forward direction or routes it to another light path, depending on the polarizing direction of the light information.

With the above sequence of operations, the polarization control optical switches direct the light information input from a plurality of input light paths to respectively selected output light paths.

A plurality of such polarization optical switches are combined to implement the polarization control optical space switch of the present invention.

According to the polarization control optical space switch of the invention, when light information input from a plurality of input light paths is to be output on respectively selected output light paths, light information input from any input light path can be output on a selected output light path by controlling only one polarization control optical switch.

Furthermore, provisions are made so that any light information input into the polarization control optical space switch is passed through the same number of switch elements regardless of the path set for it.

DESCRIPTION OF THE PREFERRED EMBODIMENTS

[Embodiment]

(Basic Configuration of the Polarization Control Optical Space Switch)

Figure 1:
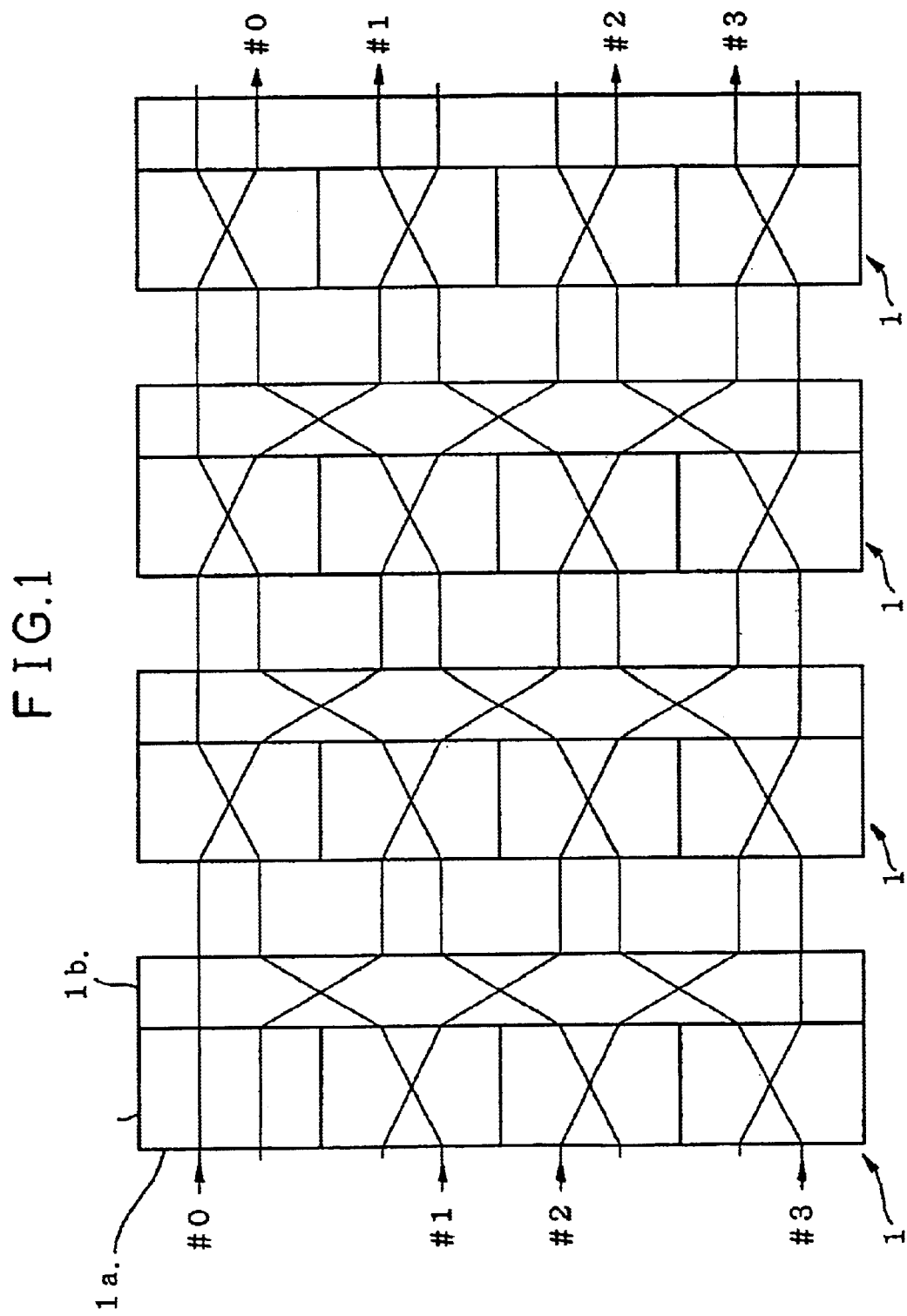
FIG. 1 is a diagram showing the basic configuration of the polarization control optical space switch according to the present embodiment.

FIG. 1 is a diagram showing the basic configuration of the polarization control optical space switch of the present embodiment.

This polarization control optical space switch is an implementation of an optical space switch having four inputs and four outputs, and comprises four polarization control optical switches 1 in cascade, each having four inputs and four outputs.

Each polarization control optical switch 1 comprises a polarization controller 1a and a light path routing element 1b.

The polarization controller 1a consists of four polarization control elements, one for each of light paths #0–#3.

Each polarization control element, when deenergized, rotates the polarizing direction of incident light information through 90°, and when energized, allows the incident light information to pass through it without change in its polarizing direction.

The light path routing element 1b routes the light information input, from the polarization controller 1a, to an appropriate output light path according to the polarizing direction of the light information.

The operation of the polarization control optical space switch will now be described with reference to FIG. 2.

Figure 2:
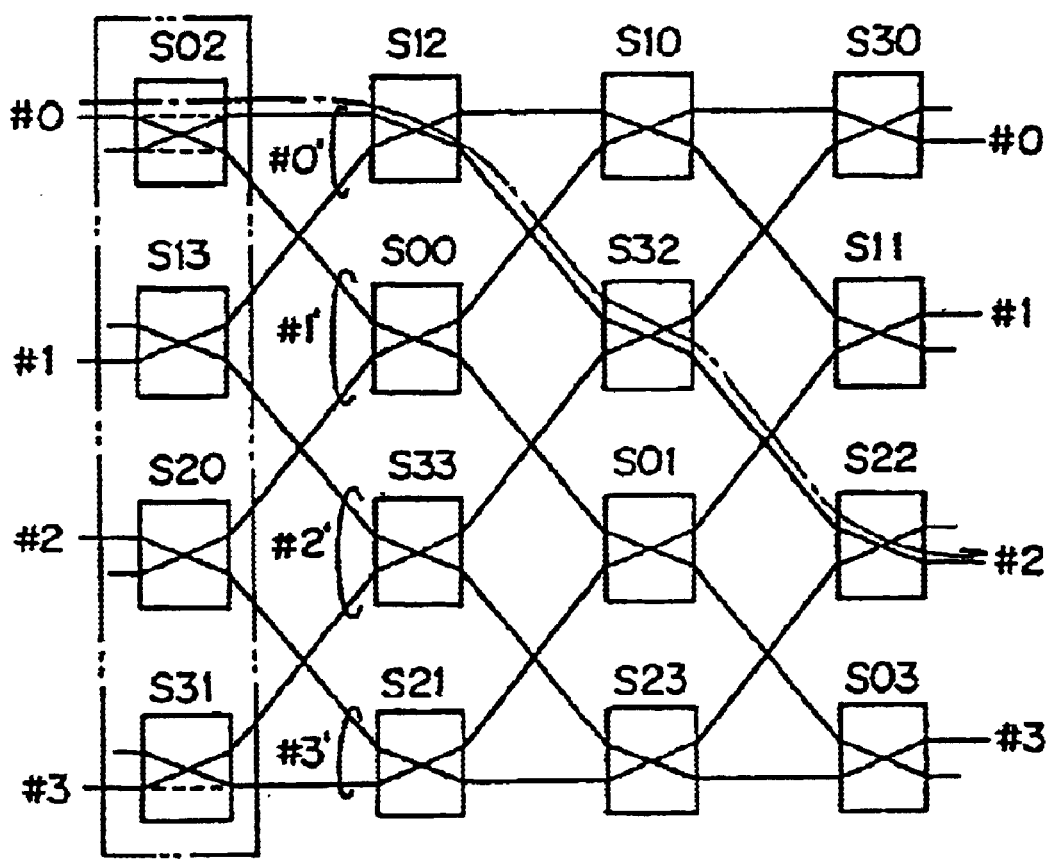
FIG. 2 is a diagram showing the functional configuration of the polarization control optical space switch according to the present embodiment.

FIG. 2 shows the functional configuration of a polarization control optical space switch (pi-loss type switch module) subsumed under the present invention.

As shown, the polarization control optical space switch has a four-input, four-output configuration. This polarization control optical space switch comprises 16 switch elements S00–S33 arranged as a matrix of four rows and four columns (hereinafter called a 4×4 matrix). Each of the switch elements S00–S33, corresponds to one polarization control element in each polarization controller 1a. The switch elements, S00–S33, are crossbar switch elements. Each switch element, in the normal deenergized state, is put in the cross state.

When performing light path switching, a voltage is applied to an apropriate switch element selected from S00–S33, to cause it to change from the cross state to the bar state (through state).

For example, when light information from an input light path #i is to be directed to an output light path #j, a voltage is applied to a switch element Sij located at a crosspoint where the input light path #i and output light path #j intersect. This causes the switch element Sij to change from the cross state to the bar state. In a specific example, when the light information from the input light path #0 is to be directed to the output light path #2, a voltage is applied to the switch element $S_{02}$ located at a cross point where the input light path #0 and output light path #2 intersect. Upon application of the voltage, the switch element $S_{02}$ is caused to change from the cross state to the bar state. In this state, the light information is passed through the switch elements, $S_{02}$, $S_{12}$, $S_{32}$, and $S_{22}$, in this order, and is output onto the output light path #2.

Similarly, if the light information from the input light path #2 is to be directed to the output light path #1, voltage should be applied to the switch element $S_{21}$. Upon application of the voltage, the switch element $S_{21}$, is caused to change from the cross state to the bar state. In this state, the light information is passed through the switch elements, $S_{20}$, $S_{21}$, $S_{01}$, and $S_{11}$, in this order, and is output onto the output light path #1.

In this manner, light path switching can be accomplished just by controlling only one switch element, and along any path thus set, the light information passes through four switch elements. This serves to suppress variations in the light information loss and crosstalk, making it possible to perform control for light information amplification and crosstalk reduction in a uniform and simplified manner.

In the case of a polarization control optical space switch comprising $m^2$ switch elements, S00–Smm, arranged as a matrix of m rows and m columns, light path switching can be achieved by applying a voltage to a single switch element selected from S00–Smm. In this polarization control optical space switch, light information passes through m switch elements along any path.

The hardware configuration of the polarization control optical switch implementing the above functional configuration will be described below.

[Embodiment 1]

(Hardware Configuration of the Polarization Control Optical Switch)

Figure 3:
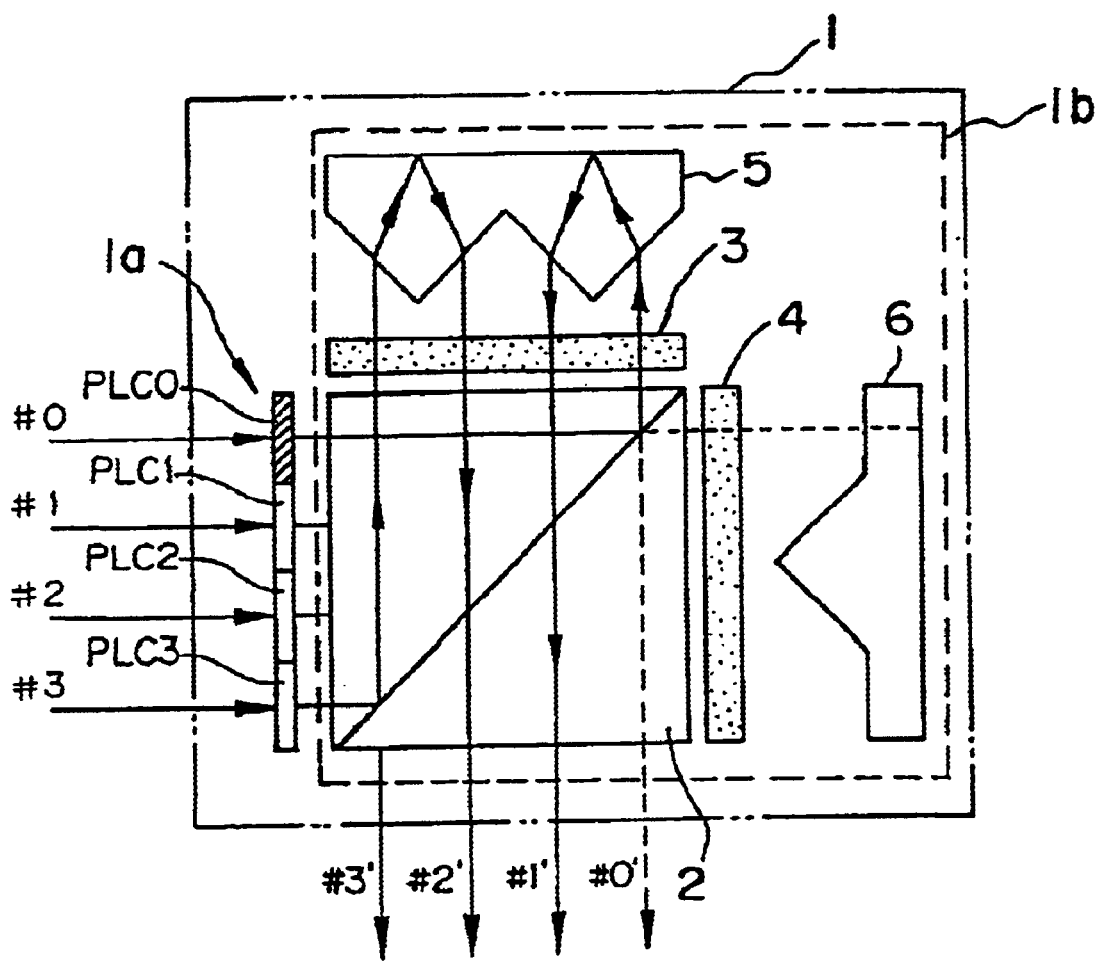
FIG. 3 is a diagram showing the hardware configuration of a polarization control optical switch according to Embodiment 1.

FIG. 3 shows the hardware configuration of a polarization control optical switch according to Embodiment 1.

The polarization control optical switch 1 shown in FIG. 3 is a hardware implementation of m switch elements arranged in each column in an m (rows)×m (columns) matrix in the functional configuration shown in FIG. 2.

The polarization control optical switch 1 comprises a light path routing element 1b and a polarization controller 1a placed on the input side of the light path routing element 1b.

The polarization controller 1a performs two functions: one is to transmit incident light information without change in its polarizing direction; and the other is to rotate its polarizing direction through 90° for output. Switching between these two functions is accomplished by the presence or absence of voltage application. For example, the polarization controller 1a may be so configured that when no voltage is applied, the incident light information is transmitted without change in its polarizing direction, and when voltage is applied, the polarizing direction is rotated through 90° during the passage through the polarization controller 1a. Alternatively, the polarization controller 1a may be so configured that when no voltage is applied, the polarizing direction of incident light information is rotated through 90°, and when voltage is applied, the light information is transmitted without change in its polarizing direction. In the case of the polarization controller 1a used in the polarization control optical switch 1 shown in FIG. 3, the polarizing direction of incident light information is rotated through 90° when no voltage is applied, while when voltage is applied, the incident light information is transmitted without change in its polarizing direction. Further, the polarization controller 1a comprises polarization control elements, PLC0–PLCm−1, the number of which is equal to the number (m) of input light paths The light path routing element 1a comprises a polarization splitter 2, a reflected-side λ/4 wavelength plate 3, a reflected-side reflection block 5, a transmitted-side λ/4 wavelength plate 4, and a transmitted-side reflection block 6.

The polarization splitter 2 transmits the light information (p-polarized light) whose polarizing direction is parallel to the plane of incidence, and reflects the light information (s-polarized light) whose polarizing direction is perpendicular to the plane of incidence.

The reflected-side λ/4 wavelength plate 3 is placed on the output side of the light information reflected from the polarization splitter 2. The reflected-side λ/4 wavelength plate 3 has the function of rotating the polarizing direction of the incident light information through π/4 and directing it to the reflected-side reflection block 5.

The reflected-side reflection block 5 is located rearwardly of the reflected-side λ/4 wavelength plate 3. The reflected-side reflection block 5 has a shape designed to reflect the incident light from any light path into an adjacent light path. For example, the incident light information from the first-stage light path is reflected into the second-stage light path adjacent to it, the incident light information from the second-stage light path is reflected into the first-stage light path, the incident light information from the third-stage light path is reflected into the fourth-stage light path adjacent to it, and the incident light information from the fourth-stage light path is reflected into the third-stage light path.

The transmitted-side λ/4 wavelength plate 4 is placed on the output side of the light information transmitted by the polarization splitter 2. The transmitted-side λ/4 wavelength plate 4 has the function of rotating the polarizing direction of the incident light information through π/4 and directing it to the transmitted-side reflection block 6.

The transmitted-side reflection block 6 is located on the output side of the transmitted-side λ/4 wavelength plate 4. The transmitted-side reflection block 6 has a shape designed to reflect the incident light from the uppermost and lowermost light paths back into the same light paths as the input paths, and reflect the incident light from any other light path into an adjacent light path. For example, the transmitted-side reflection block 6 reflects the incident light information from the first-stage light path back into the first-stage light path, the same path as the input light path, and the incident light information from the fourth-stage light path back into the fourth-stage light path, the same path as the input light path. Further, the transmitted-side reflection block 6 reflects the incident light information from the second-stage light path into the third-stage light path, and the incident light information from the third-stage light path into the second-stage light path.

(Operation of the Polarization Control Optical Switch)

The operation of the polarization control optical switch 1 will be described below, taking an example when m=4.

Figure 4A:
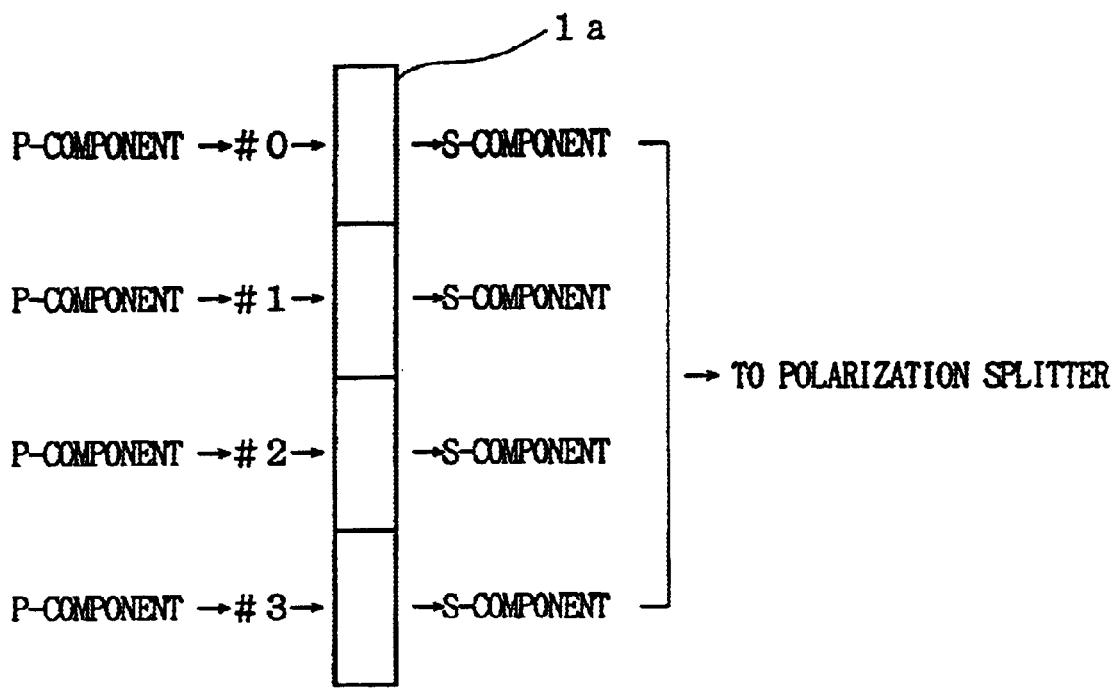
FIG. 4(a) shows an operational example (1) in Embodiment 1.
Figure 4B:
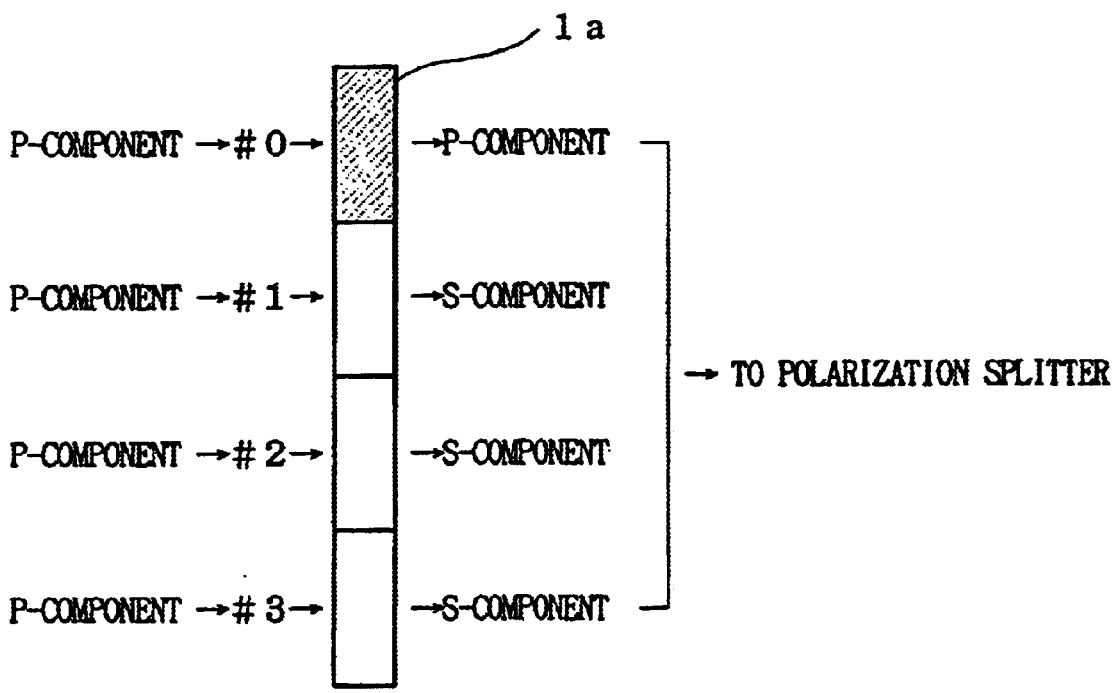
FIG. 4(b) shows an operational example (2) in Embodiment 1.

In the normal deenergized state, the polarization control elements, PLC0–PLC3, rotate the p-polarized light input from the respective input light paths, #0–#3, to convert it into s-polarized light, which is then input into the polarization splitter 2 (see FIG. 4(a)).

The polarization splitter 2 reflects the s-polarized light input from any of the input light paths #0–#3.

The light information thus reflected by the polarization splitter 2 enters the reflected-side reflection block 5 via the reflected-side λ/4 wavelength plate 3.

The reflected-side reflection block 5 shifts the light path for the light information by one light path and reflects the incident light into an adjacent light path.

The light information reflected by the reflected-side reflection block 5 is again passed through the reflected-side λ/4 wavelength plate 3 before entrance into the polarization splitter 2.

Since the light information is passed through the reflected-side λ/4 wavelength plate 3 twice during the round trip, the polarizing direction of the light information is rotated and converted from s-polarized light into p-polarized light.

The light information converted from s-polarized light to p-polarized light is transmitted through the polarization splitter 2 for output.

In FIG. 3, the incident light from the input light path #0 is output on the output path #1', the incident light from the light path #1 is output on the output path #0', the incident light from the light path #2 is output on the output light path #3', and the incident light from the input light path #3 is output on the output light path #2'. The polarization control optical switch 1 corresponds to the 4 switch element array in the first column in the functional configuration shown in FIG. 2.

In the functional configuration shown in FIG. 2, switching the light information from the input light path #0 to the output light path #2 is accomplished by voltage-controlling the switch element S02, but in the actual hardware configuration, this is done by voltage-controlling the polarization control element PLC0. With this voltage control, the polarization control element PLC0 transmits the incident light information without rotating its polarizing direction, i.e, the p-polarized light is input into the polarization splitter 2 with its p-polarization state retained.

The polarization splitter 2 transmits the p-polarized light incident from the polarization control element PLC0, for input into the transmitted-side λ/4 wavelength plate 4.

The transmitted-side λ/4 wavelength plate 4 rotates the polarizing direction of the p-polarized light through 1/4π, for input into the transmitted-side reflection block 6.

Since the transmitted-side reflection block 6 reflects the light information incident along the input light path #0, the uppermost light path, without shifting its light path, the light information is fed back into the input path #0.

The light information reflected by the transmitted-side reflection block 6 is again passed through the transmitted-side λ/4 wavelength plate 4 before entrance into the polarization splitter 2. Since the light information is passed through the transmitted-side λ/4 wavelength plate 4 twice during the round trip, the information light is rotated and converted from p-polarized light into s-polarized light. The light information is then reflected by the polarization splitter 2 and output onto the output light path #0'. This output path corresponds to the dotted line shown in the switch element S02 in FIG. 2.

Thus, in the polarization control optical switch 1, by applying a voltage to a designated polarization control element selected from PLC0–PLC3, the light information incident from each of the four input paths can be directed to a desired output light path.

(Hardware Configuration of the Polarization Control Optical Space Switch)

Figure 5:
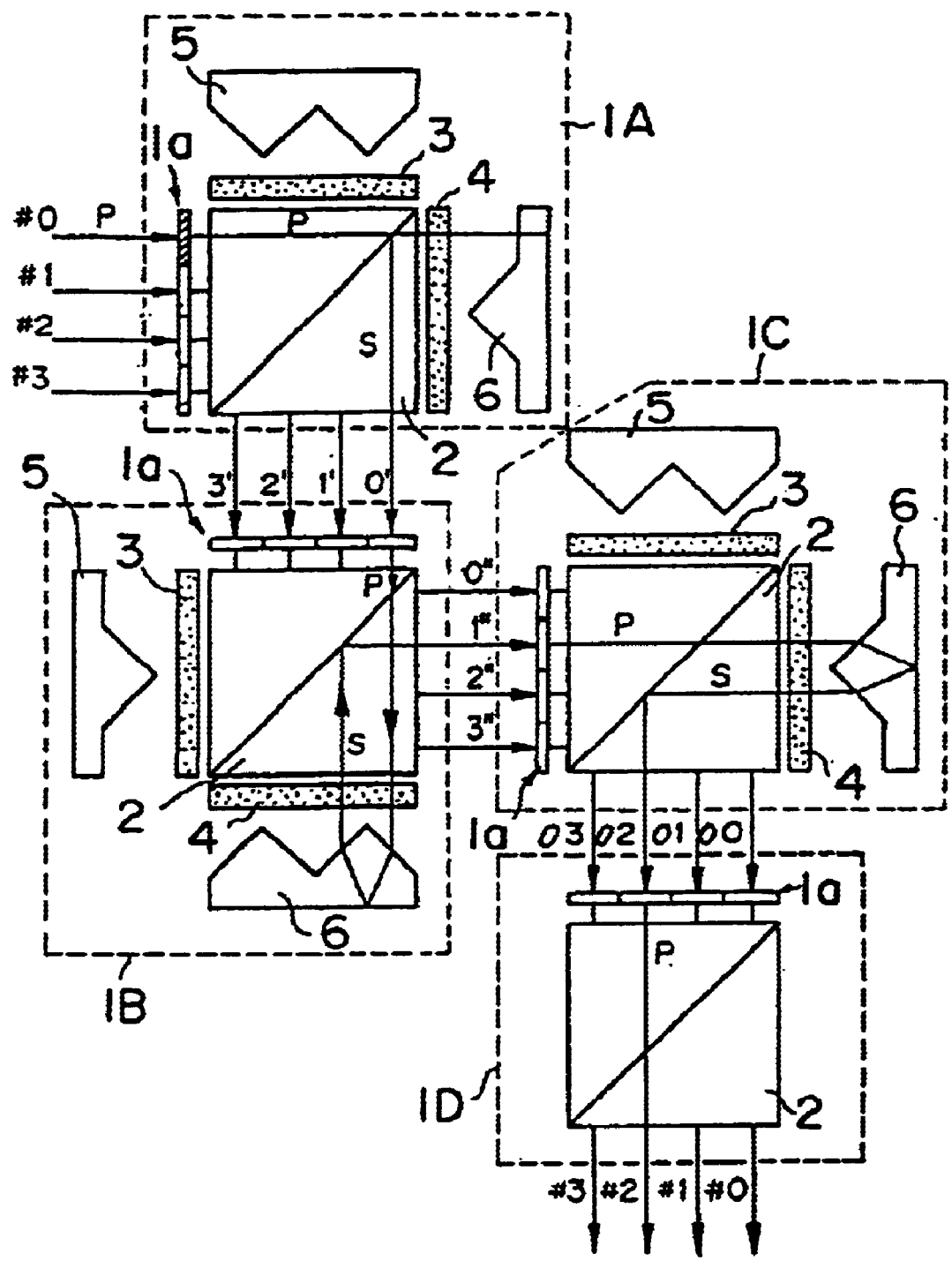
FIG. 5 is a diagram showing the hardware configuration of a polarization control optical space switch according to Embodiment 1.

FIG. 5 shows the hardware configuration of a polarization control optical space switch corresponding to the functional configuration shown in FIG. 2.

This polarization control optical space switch is interposed between four input light paths and four output light paths, and comprises four polarization control optical switches 1A, 1B, 1C, and 1D.

The polarization control optical switch 1A is an implementation of the four-stage switch element array arranged in the first column in FIG. 2, the polarization control optical switch 1B is an implementation of the four-stage switch element array arranged in the second column in FIG. 2, the polarization control optical switch 1C is an implementation of the four-stage switch element array arranged in the third column in FIG. 2, and the polarization control optical switch 1D is an implementation of the four-stage switch element array arranged in the fourth column in FIG. 2.

The polarization control optical switches 1A and 1C each have the same configuration as that of the polarization control optical switch 1 shown in FIG. 3.

The reflected-side reflection block 5 in the polarization control optical switch 1B has the same shape as that of the transmitted-side reflection block 6 in the polarization control optical switch 1A.

Also, the transmitted-side reflection block 6 in the polarization control optical switch 1B has the same shape as that of the reflected-side reflection block 5 in the polarization control optical switch 1A.

The function of the polarization control optical switch 1D in the fourth column is just to transmit the incident light through it; therefore, the light path routing element 1b in it consists only of a polarization splitter 2.

(Operation of the Polarization Control Optical Space Switch)

The operation of the polarization control optical space switch of Embodiment 1 will be described below.

When the light information from the input light path #0 is to be directed to the output light path #2, for example, voltage is applied to the polarization control element PLC0, corresponding to the input light path #0, in the polarization control optical switch 1A. In this situation, the polarization control element PLC0 allows the p-polarized light information input along the input light path #0 to pass through with its p-polarization state retained, for input into the polarization splitter 2. The polarization splitter 2 allows the p-polarized light incident along the input light path #0 to pass through it and enter the transmitted-side λ/4 wavelength plate 4.

The transmitted-side λ/4 wavelength plate 4 rotates the polarizing direction of the p-polarized light through 1/4π, and passes the output light to the transmitted-side reflection block 6.

The transmitted-side reflection block 6 reflects the p-polarized light from the input light path #0 back into the same light path #0 without shifting its light path.

The light reflected back into the light path #0 is once again passed through the transmitted-side λ/4 wavelength plate 4 and thus converted into s-polarized light.

The s-polarized light exiting the transmitted-side λ/4 wavelength plate 4 enters the polarization splitter 2 which reflects the s-polarized light into the light path #0'.

The s-polarized light reflected into the light path #0' enters the polarization controller 1a of the polarization control optical switch 1B, where it is converted into p-polarized light before entrance into the polarization splitter 2.

The polarization splitter 2 transmits the p-polarized light to the transmitted-side λ/4 wavelength plate 4.

The transmitted-side λ/4 wavelength plate 4 rotates the polarizing direction of the p-polarized light through 1/4π, and passes the output light to the transmitted-side reflection block 6.

The transmitted-side reflection block 6 reflects the light information incident along the light path #0' into the light path #1'. The reflected light enters the transmitted-side λ/4 wavelength plate 4.

The transmitted-side λ/4 wavelength plate 4 rotates the polarizing direction of the light information through 1/4π, thereby converting the light information into s-polarized light.

The s-polarized light is reflected by the polarization splitter 2 and is output onto the light path #1".

Next, in the polarization control optical switch 1C, the s-polarized light incident from the light path #1" is converted by the polarization controller 1a into p-polarized light.

The light information converted to the p-polarized light enters the polarization splitter 2.

The polarization splitter 2 transmits the p-polarized light to the transmitted-side λ/4 wavelength plate 4.

The transmitted-side λ/4 wavelength plate 4 rotates the polarizing direction of the p-polarized light through 1/4π, and passes the output light to the transmitted-side reflection block 6.

The transmitted-side reflection block 6 reflects the light information incident along the light path #1" into the light path #2".

The reflected light information is passed by the light path #2" and once again enters the transmitted-side λ/4 wavelength plate 4.

The transmitted-side λ/4 wavelength plate 4 rotates the polarizing direction of the light information through 1/4π, thereby converting the light information into s-polarized light. The s-polarized light once again enters the polarization splitter 2.

The polarization splitter 2 reflects the s-polarized light incident along the light path #2" into the light path #02.

The s-polarized light output on the light path #02 enters the polarization control optical switch 1D.

In the polarization control optical switch 1D, the polarization controller 1a converts the s-polarized light incident along the light path #02 into p-polarized light, which is input into the polarization splitter 2.

The polarization splitter 2 transmits the p-polarized light incident along the light path #02 and output it on the output light path #2. The incident light from the input light path #0 is thus output on the output light path #2.

Likewise, when the incident light from the input light path #2 is to be directed to the output light path #3, the switch element S23 in FIG. 2 should be controlled by voltage application. This switch element is located at the third column in the fourth row in the polarization optical space switch shown in FIG. 2, which means that, in the case of the polarization control optical space switch in FIG. 5, the voltage should be applied to the polarization controller PLC3 in the polarization control optical switch 1C.

As described, according to Embodiment 1, when light information incident from an input light path is to be directed to a desired light path, voltage should be applied to only one polarization controller. Furthermore, since all light information always passes through the same number (m) of polarization control optical switches, 1A, 1B, 1C, and 1D (hereinafter collectively referred to as the polarization control optical switch 1), regardless of the path set up between the input and output paths, the amount of loss due to transmission through the polarization control optical switch 1 and the value of crosstalk are kept constant.

(Alternative Hardware Configuration of the Polarization Control Optical Space Switch)

Figure 6:
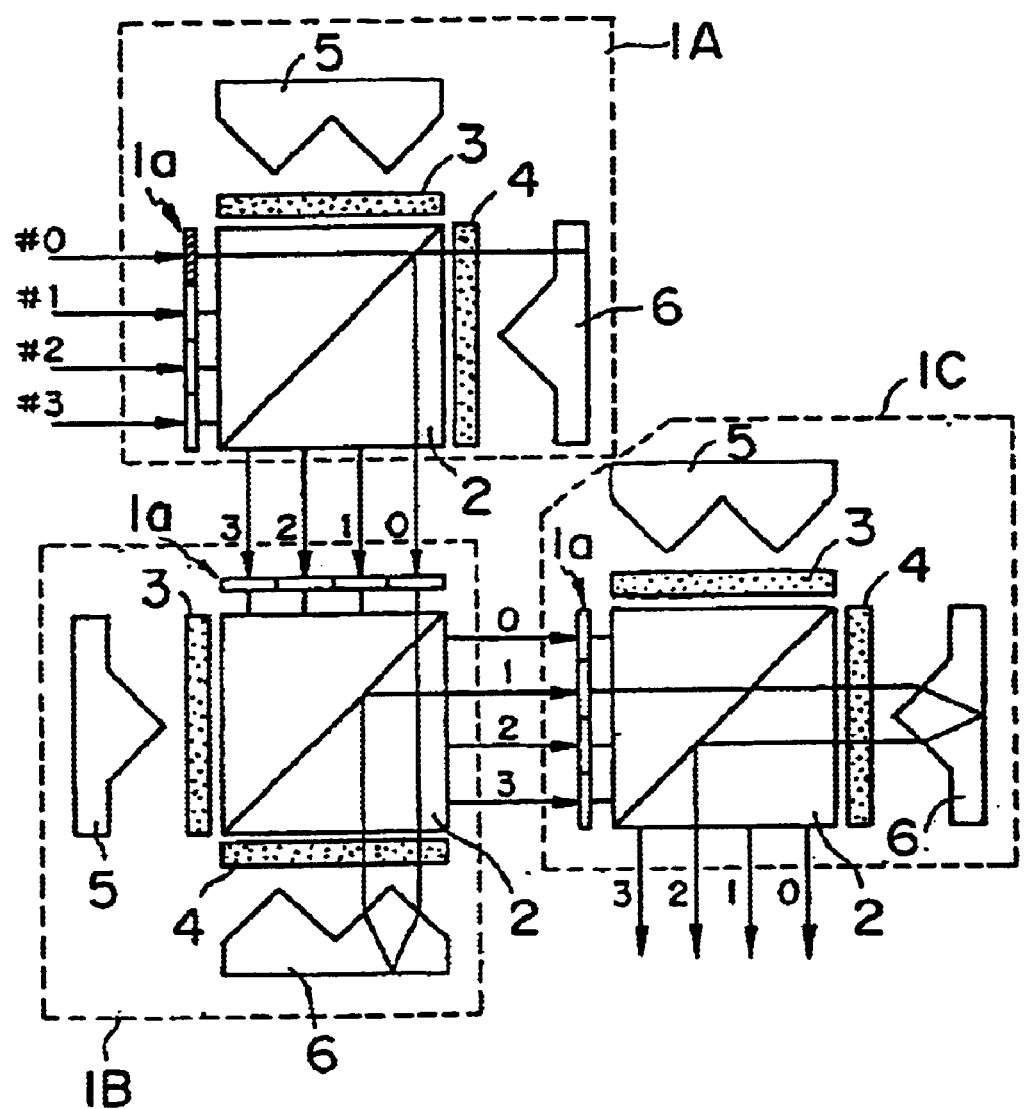
FIG. 6 is a diagram showing an alternative configuration of the polarization control optical space switch in Embodiment 1.

FIG. 6 shows an alternative configuration of the polarization control optical space switch corresponding to the functional configuration shown in FIG. 2.

The polarization control optical space switch shown is interposed between four input light paths and four output light paths, and comprises three polarization control optical switches 1A, 1B, and 1C.

The polarization control optical switches, 1A, 1B, and 1C, respectively, are identical in configuration to the polarization control optical switches, 1A, 1B, and 1C, shown in FIG. 5.

That is, in the polarization control optical space switch shown in FIG. 5, the polarization control optical switch 1D placed in the fourth column is only provided to transmit the light information incident from the polarization control optical switch 1C. Accordingly, the polarization control optical switch 1D may be omitted.

The operation of this polarization control optical space switch is the same as that of the polarization control optical space switch shown in FIG. 5, and therefore, description thereof is not repeated here.

[Embodiment 2]

(Hardware Configuration of the Polarization Control Optical Switch)

Figure 7:
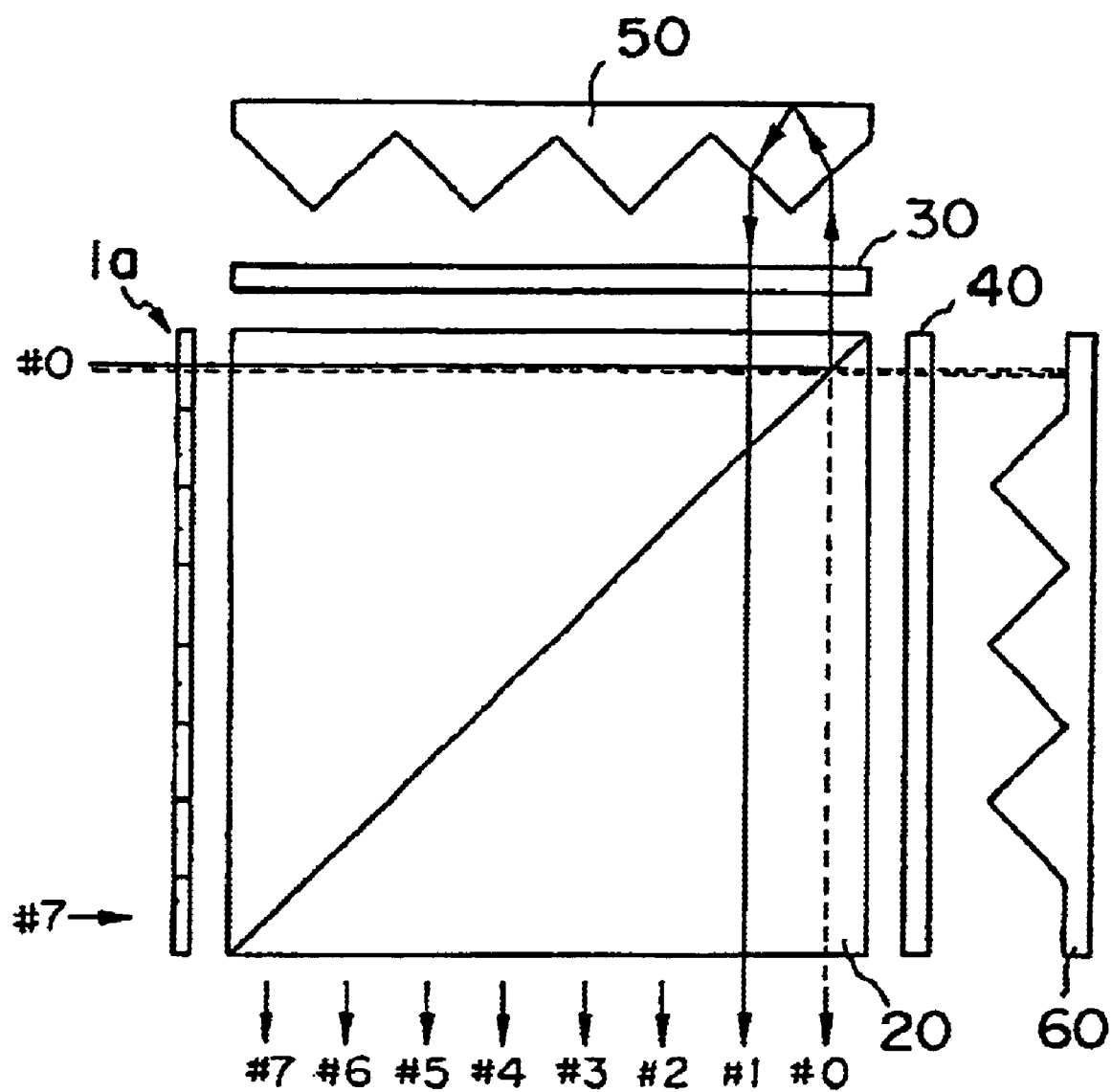
FIG. 7 is a diagram showing the hardware configuration of a polarization control optical switch according to Embodiment 2.

FIG. 7 shows the configuration of a polarization control optical switch 1 according to Embodiment 2.

The polarization control optical switch 1 has eight input light paths and eight output light paths.

The light path routing element 1b of this polarization control optical switch 1 comprises: a polarization splitter 20 which transmits p-polarized light and reflects s-polarized light; a reflected-side λ/4 wavelength plate 30 placed on the output side of light information reflected by the polarization splitter 20; a reflected-side reflection block 50 placed on the output side of the reflected-side λ/4 wavelength plate 30; a transmitted-side λ/4 wavelength plate 40 placed on the output side of light information transmitted by the polarization splitter 20; and a transmitted-side reflection block 60 placed on the output side of the transmitted-side λ/4 wavelength plate 40.

The polarization controller 1a of the polarization control optical switch 1 comprises eight polarization control elements PLC0–PLC7. The polarization control elements, PLC0–PLC7, are so set that when no voltage is applied, p-polarized light is converted into s-polarized light, while when voltage is applied, p-polarized light is transmitted with its p-polarization state retained.

The polarization splitter 20 reflects s-polarized light, while allowing p-polarized light to pass through.

The transmitted-side λ/4 wavelength plate 40 and reflected-side λ/4 wavelength plate 30 each have the function of rotating the polarizing direction of light information through π/4.

The transmitted-side reflection block 60 has a shape designed to reflect light information incident along the uppermost light path (light path #0 in the first column) and lowermost light path (light path #7 in the eighth column) back into the same light paths that the light information entered (i.e., the light information incident along the light path #0 is reflected back into the light path #0, and the light information from the light path #7 back into the light path #7), and to reflect light information incident along other light paths (light paths #1–#6) into respectively adjacent light paths. More specifically, the shape of the transmitted-side reflection block 60 is such that the light information incident along the light path #1 in the second column is reflected into the light path #2 in the third column adjacent to it, the light information incident along the light path #2 in the third column is reflected into the light path #1 in the second column adjacent to it, the light information incident along the light path #3 in the fourth column is reflected into the light path #4 in the fifth column adjacent to it, the light information incident along the light path #4 in the fifth column is reflected into the light path #3 in the fourth column adjacent to it, the light information incident along the light path #5 in the sixth column is reflected into the light path #6 in the seventh column adjacent to it, and the light information incident along the light path #6 in the seventh column is reflected into the light path #5 in the sixth column adjacent to it.

On the other hand, the reflected-side reflection block 50 has a shape designed to reflect light information incident along any light path into a light path adjacent to it. That is, the shape of the reflected-side reflection block 50 is such that the light information incident along the light path #0 in the first column is reflected into the light path #1 in the second column adjacent to it, the light information incident along the light path #1 in the second column is reflected into the light path #0 in the first column adjacent to it, the light information incident along the light path #2 in the third column is reflected into the light path #3 in the fourth column adjacent to it, the light information incident along the light path #3 in the fourth column is reflected into the light path #2 in the third column adjacent to it, the light information incident along the light path #4 in the fifth column is reflected into the light path #5 in the sixth column adjacent to it, the light information incident along the light path #5 in the sixth column is reflected into the light path #4 in the fifth column adjacent to it, the light information incident along the light path #6 in the seventh column is reflected into the light path #7 in the eighth column adjacent to it, and the light information incident along the light path #7 in the eighth column is reflected into the light path #6 in the seventh column adjacent to it.

By arranging eight such polarization control optical switches 1 in cascade, a polarization control optical space switch having eight inputs and eight outputs can be constructed.

[Embodiment 3]

(Hardware Configuration of the Polarization Control Optical Switch)

Figure 8:
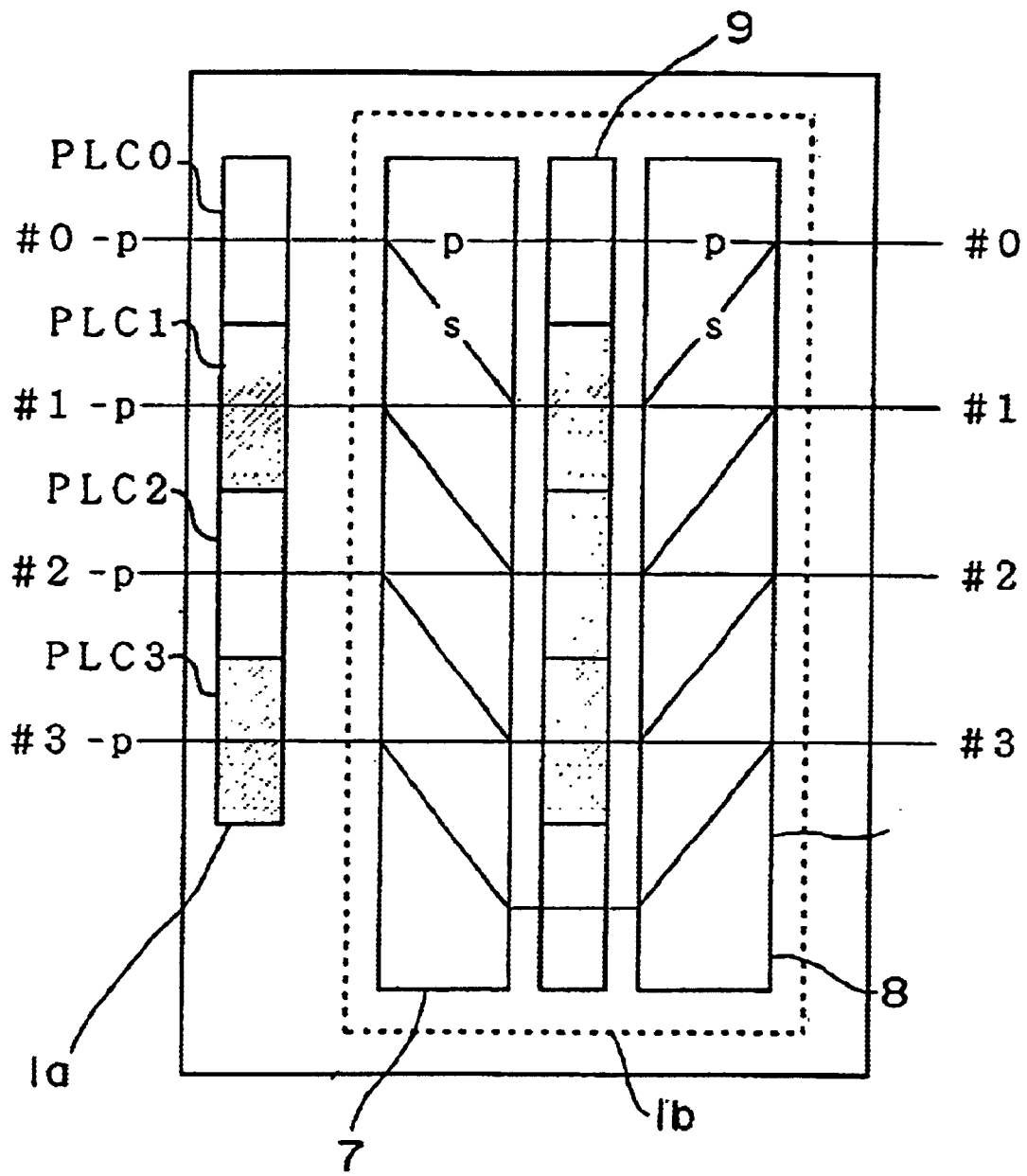
FIG. 8 is a diagram showing the hardware configuration of a polarization control optical switch according to Embodiment 3.

FIG. 8 shows the hardware configuration of a polarization control optical switch according to Embodiment 3.

This polarization control optical switch has four inputs and four outputs.

As in Embodiment 1, the polarization control optical switch 1 comprises a polarization controller 1a and a light path routing element 1b.

The polarization controller 1a works to rotate, or not rotate, the polarizing direction of incident light through 90°, depending on the presence or absence of voltage application. More specifically, the polarization controller 1a consists of polarization control elements, PLC0–PLC3, the number of which is equal to the number of input light paths. Each of the polarization control elements, PLC0–PLC3, works to rotate, or not rotate, the polarizing direction of incident light information through 90°, depending on the presence or absence of voltage application.

For example, in the configuration of FIG. 8, the polarization control elements PLC0 and PLC2, placed in the light paths #0 and #1 respectively, work to rotate the polarizing direction of incident light information through π/2 when no voltage is applied to them. That is, with no voltage applied, the polarization control elements, PLC0 and PLC2, each work to convert p-polarized light into s-polarized light and vice versa. On the other hand, when voltage is applied, the polarization control elements, PLC0 and PLC2, do not rotate the polarizing direction of incident light information. That is, with voltage applied, the polarization control elements, PLC0 and PLC2, each work to transmit p-polarized light with its p-polarization state retained and s-polarized light with its s-polarization state retained.

The polarization control elements PLC1 and PLC3, placed in the light paths #1 and #3 respectively, work to output p-polarized light with its p-polarization state retained, and s-polarized light with its s-polarization state retained, when no voltage is applied to them. When voltage is applied, the polarization control elements, PLC1 and PLC3, each work to convert p-polarized light into s-polarized light and vice versa.

The light path routing element 1b is provided to implement the cross connections between the rows and columns of switch elements in the functional configuration shown in FIG. 2.

The light path routing element 1b comprises a polarized light downward routing element 7, a polarized light upward routing element 8 and a $\lambda/2$ wavelength plate array 9 interposed between them.

The polarized light routing elements 7 and 8 in Embodiment 3 are each constructed from a birefringent panel formed from calcite or the like.

The polarized light downward routing element 7 transmits incident light information in the rectilinear forward direction when the light information is p-polarized light, and diffracts incident light information toward the light path one path downward when the light information is s-polarized light. More specifically, when p-polarized light is incident along a light path #i, the polarized light downward routing element 7 outputs the p-polarized light on the light path #i, and when s-polarized light is incident along the light path #i, outputs the s-polarized light on the light path #(i+1).

By contrast, the polarized light upward routing element 8 transmits incident light information in the rectilinear forward direction when the light information is p-polarized light, and diffracts incident light information toward the light path one path upward when the light information is s-polarized light. More specifically, when p-polarized light is incident along the light path #i, the polarized light upward routing element 8 outputs the p-polarized light on the light path #i, and when s-polarized light is incident along the light path #i, outputs the s-polarized light on the light path #(i−1).

The $\lambda/2$ wavelength plate array 9 has a width equivalent to five light paths, and consists of light-transmitting members on top and bottom, and a $\lambda/4$ wavelength plate sandwiched between these light-transmitting members and having a width equivalent to three light paths. The top light transmitting member is located in the light path #0, and the $\lambda/2$ wavelength plate in the light paths #1–#3.

The light-transmitting members are each formed from glass or like material, through which incident light information is transmitted without change in its polarizing direction.

The $\lambda/2$ wavelength plate is an element through which the polarizing direction of incident light information is rotated through $\pi/2$. More specifically, when the incident light information is p-polarized light, the $\lambda/2$ wavelength plate rotates this light information so that it emerges as s-polarized light. Furthermore, when the incident light information is s-polarized light, the $\lambda/2$ wavelength plate rotates this light information so that it emerges as p-polarized light.

(Operation of the Polarization Control Optical Switch)

The operation of the polarization control optical switch will be described below.

With no voltage applied to the polarization controller 1a, when p-polarized light is input along the input light path #0, the polarization control element PLC0 rotates the p-polarized light so that it emerges as s-polarized light.

The s-polarized light output from the polarization control element PLC0 enters the polarized light downward routing element 7.

The polarized light downward routing element 7 shifts the light path for the s-polarized light downward by one path, i.e., to the light path #1 for output.

The s-polarized light output on the light path #1 by the polarized light downward routing element 7 enters the $\lambda/2$ wavelength plate array 9.

The $\lambda/2$ wavelength plate array 9 rotates the s-polarized light so that it emerges as p-polarized light.

The p-polarized light output from the $\lambda/2$ wavelength plate array 9 enters the polarized light upward routing element 8.

The polarized light upward routing element 8 transmits the p-polarized light incident along the light path #1 in the rectilinear forward direction. Thus, when no voltage is applied to the polarization control element PLC0, the p-polarized light input from the light path #0 is output on the light path #1.

Next, switch operation will be described below for the case in which voltage is applied to the polarization control element PLC0.

The p-polarized light incident along the light path #0 enters the polarization control element PLC0.

The polarization control element PLC0, with voltage applied to it, transmits the p-polarized light without changing its p-polarization state.

The p-polarized light output from the polarization control element PLC0 enters the polarized light downward routing element 7.

The polarized light downward routing element 7 transmits the incident p-polarized light in the rectilinear forward direction.

The p-polarized light output from the polarized light downward routing element 7 enters the uppermost light path in the $\lambda/2$ wavelength plate array 9.

The $\lambda/2$ wavelength plate array 9 allows the p-polarized light incident along the uppermost light path to pass through it with its polarizing direction retained.

The p-polarized light output from the $\lambda/2$ wavelength plate array 9 is input to the polarized light upward routing element 8.

The polarized light upward routing element 8 transmits the incident p-polarized light in the rectilinear forward direction. Thus, when voltage is applied to the polarization control element PLC0, the p-polarized light input from the light path #0 is output on the light path #0.

Thus, by controlling the voltage application to each of the polarization control elements PLC0–PLC3, light information entered from any of the light paths #0–#3 can be output on a desired light path selected from #0–#3.

(Configuration of the Polarization Control Optical Space Switch)

The configuration of a polarization control optical space switch will be described below which employs the polarization control optical switch 1 of Embodiment 3.

Figure 9:
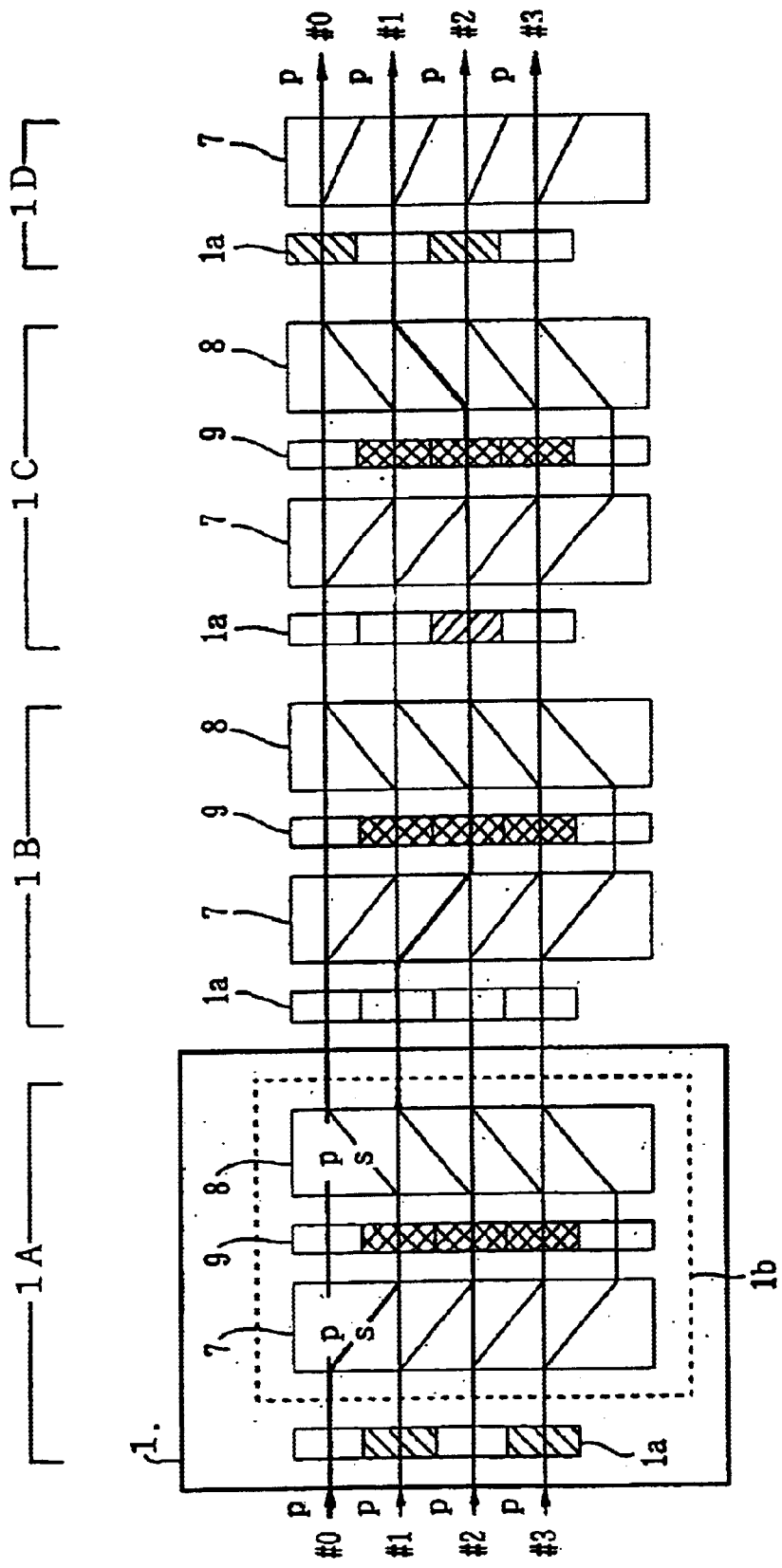
FIG. 9 is a diagram showing the hardware configuration of a polarization control optical space switch according to Embodiment 3.

FIG. 9 shows the configuration of the polarization control optical space switch according to Embodiment 3.

This polarization control optical space switch comprises four polarization control optical switches, 1A, 1B, 1C, and 1D, in cascade, thereby implementing a four-input, four-output optical space switch.

The polarization control optical switch 1A, located at the first stage as viewed from the input side, is identical in configuration to the polarization control optical switch 1 shown in FIG. 8.

The polarization control optical switches 1B and 1C, located at the second and third stages respectively, differ from the polarization control optical switch 1A in the setting of the polarization controller 1a. More specifically, the polarization controller 1a in the polarization control optical switch 1A is so set that when no voltage is applied, the polarization control element PLC1 positioned in the light path #1 and the polarization control element PLC3 positioned in the light path #3 transmit incident light information without changing its polarizing direction, whereas in the second-stage and third-stage polarization control optical switches 1B and 1C, all the four polarization control elements PLC0–PLC3 are so set as to rotate p-polarized light to convert it to s-polarized light and vice versa, when no voltage is applied.

The polarization control optical switch 1D at the fourth stage comprises a polarization controller 1a and a polarized light downward routing element 7. In the polarization controller 1a, the polarization control element PLC0 positioned in the light path #0 and the polarization control element PLC2 positioned in the light path #2 are so set as to transmit p-polarized light as p-polarized light, and s-polarized light as s-polarized light, when no voltage is applied. On the other hand, when voltage is applied, the polarization control elements PLC0 and PLC2 rotate p-polarized light to convert it to s-polarized light and vice versa.

The polarization control element PLC1 positioned in the light path #1 and the polarization control element PLC3 positioned in the light path #3 are so set as to rotate p-polarized light to convert it to s-polarized light and vice versa, when no voltage is applied. On the other hand, when voltage is applied, the polarization control elements PLC1 and PCL3 transmit p-polarized light as p-polarized light and s-polarized light as s-polarized light.

The polarized light downward routing element 7 has the function of transmitting light information, entering along the light paths #0–#3, through to the respective light paths #0–#3 when the polarizing direction of the light information is p-polarization.

(Operation of the Polarization Control Optical Space Switch)

The operation of the polarization control optical space switch will be described below.

It is assumed that in the polarization control optical space switch of this embodiment, all light information input along the input light paths #0–#3 is p-polarized light.

The following description deals specifically with a case in which a path is set up between the input light path #0 and the output light path #1.

To set up a path between the input light path #0 and the output light path #1, voltage should be applied to the switch element S01 located at the third column in the third row in the functional configuration shown in FIG. 2.

In this embodiment, this means that voltage should be applied to the polarization control element PLC2 (indicated by hatching in FIG. 9) in the polarization control optical switch 1C located at the third stage of the polarization control optical space switch.

This polarization control element PLC2, when in the energized state, transmits p-polarized light as p-polarized light and s-polarized light as s-polarized light.

Light information incident along the light path #0 first enters the polarization control optical switch 1A at the first stage.

In the first-stage polarization control optical switch 1A, the light information incident along the light path #0 enters the polarization control element PLC0.

The polarization control element PLC0 rotates the light information to convert it from p-polarized light to s-polarized light.

The light information output from the polarization control element PLC0 enters the light path routing element 1b.

In the light path routing element 1b, the light information from the light path #0 is routed to the light path #1 by the polarized light downward routing element 7.

The light information output from the polarized light downward routing element 7 is passed along the light path #1 and enters the λ/2 wavelength plate array 9.

The λ/2 wavelength plate array 9 rotates the polarizing direction of the light information to convert it from s-polarized light to p-polarized light, which is input to the polarized light upward routing element 8.

The polarized light upward routing element 6 allows the light information to travel straight ahead along the light path #1.

The light information passed along the light path #1 then enters the polarization control optical switch 1B at the second stage.

In the second-stage polarization control optical switch 1B, the light information from the light path #1 enters the polarization control element PLC1.

The polarization control element PLC1 rotates the light information (p-polarized light) incident along the light path #1, to convert it to s-polarized light, which is input to the light path routing element 1b.

In the light path routing,element 1b, the light information from the light path #1 enters the polarized light downward routing element 7.

The polarized light downward routing element 7 routes the light information from the light path #1 to the light path #2 prior to input to the λ/2 wavelength plate array 9.

The λ/2 wavelength plate array 9 rotates the light information (s-polarized light) incident along the light path #2, to convert it to p-polarized light, which is input to the polarized light upward routing element 8.

The polarized light upward routing element 8 transmits the light information (p-polarized light) along the light path #2 without changing its light path.

The light information (p-polarized light) output along the light path #2 from the second-stage polarization control optical switch 1B enters the polarization control optical switch 1C at the third stage.

In the third-stage polarization control optical switch 1C, the light information incident along the light path #2 enters the polarization control element PLC2 that is placed under voltage control.

The polarization control element PLC2, placed in the energized state, transmits the incident light information (p-polarized light), with its p-polarization state retained, to the light path routing element 1b.

In the light path routing element 1b, the light information enters the polarized light downward routing element 7.

The polarized light downward routing element 7 transmits the light information (p-polarized light) along the light path #2 to the λ/2 wavelength plate array 9 without changing its light path.

The λ/2 wavelength plate array 9 rotates the light information (p-polarized light) incident along the light path #2, to convert it to s-polarized light, which is input to the polarized light upward routing element 8.

The polarized light upward routing element 8 routes the light information (s-polarized light) from the light path #2 to the light path #1 for output.

The light information (s-polarized light) output along the light path #1 from the third-stage polarization control optical switch 1C enters the polarization control optical switch 1D at the fourth stage.

In the fourth-stage polarization control optical switch 1D, the light information incident along the light path #1 enters the polarization control element PLC1.

The polarization control element PLC1 rotates the light information (s-polarized light) incident along the light path #1, to convert it to p-polarized light, which is input to the polarized light downward routing element 7.

The polarized light downward routing element 7 transmits the light information (p-polarized light) along the light path #1, so that the light information is output on the output light path #1.

Thus, a path has been set up between the input light path #0 and the output light path #1.

As described, according to the polarization control optical space switch of Embodiment 3, the path setup between an input light path #i and an output light path #j can be accomplished by controlling only one polarization control element PLC.

[Embodiment 4]

(Hardware Configuration of the Polarization Control Optical Switch)

Figure 10:
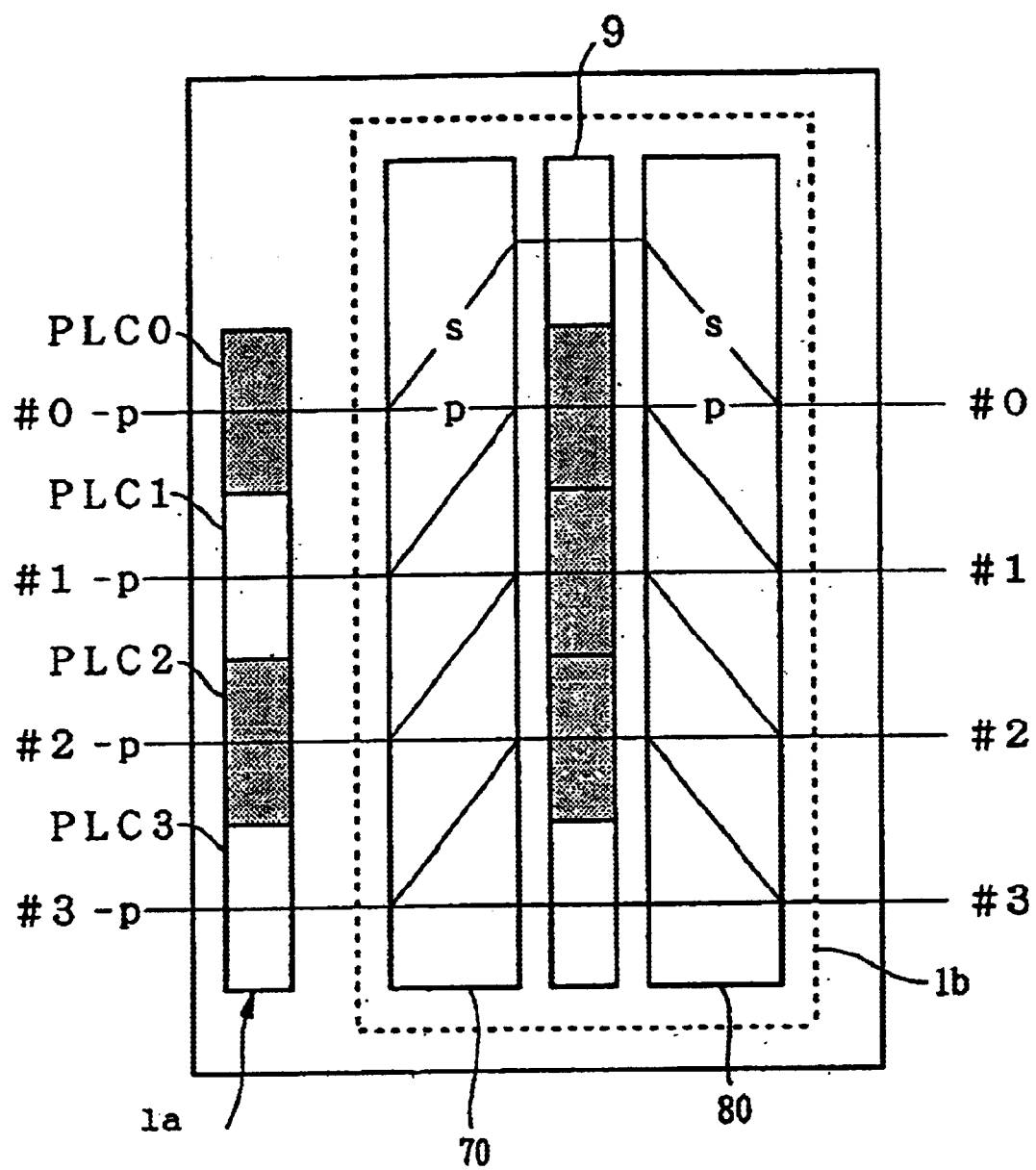
FIG. 10 is a diagram showing the hardware configuration of a polarization control optical switch according to Embodiment 4.

FIG. 10 shows the configuration of a polarization control optical switch according to Embodiment 4.

The polarization control optical switch 1 shown has four inputs and four outputs, and is designed to set up a path for light information which entered as p-polarized light.

The polarization control optical switch 1 comprises a polarization controller 1a and a light path routing element 1b.

As in the foregoing Embodiment 3, the polarization controller 1a consists of four polarization control elements PLC0–PLC3. In the polarization controller 1a shown here, the polarization control elements PLC0 and PLC2, positioned in the light paths #0 and #2 respectively, are so set as to transmit incident light information without rotating its polarizing direction when no voltage is applied, and to rotate the polarizing direction of incident light information through 90° when voltage is applied. On the other hand, the polarization control elements PLC1 and PCL3, positioned in the light paths #1 and #3 respectively, are so set as to rotate the polarizing direction through 90° when no voltage is applied, and to transmit the incident light without rotating its polarizing direction when voltage is applied.

The light path routing element 1b consists of a polarized light upward routing element 70, a λ/2 wavelength plate array 9, and a polarized light downward routing element 80, coupled in cascade in this order from the input side.

The polarized light upward routing element 70 transmits incident light information in the rectilinear forward direction when the polarizing direction of the light information is p-polarization, and diffracts incident light information toward the light path one path upward when the polarizing direction of the light information is s-polarization.

By contrast, the polarized light downward routing element 80 diffracts incident light information toward the light path one path downward when the polarizing direction of the light information is s-polarization, and transmits incident light information in the rectilinear forward direction, without diffracting it, when the polarizing direction of the light information is p-polarization.

The λ/2 wavelength plate array 9 consists of light-transmitting members on top and bottom, each equivalent to one-light-path width, and a λ/2 wavelength plate equivalent to three-light-path width, sandwiched between the light-transmitting members. The top light-transmitting member is located in the light path #0, and the λ/2 wavelength plate of three-light-path width in the light paths #1–#3.

The polarized light upward routing element 70 and the polarized light downward routing element 80 are each constructed from a birefringent plate, as in the foregoing Embodiment 3.

(Configuration of the Polarization Control Optical Space Switch)

The configuration of a polarization control optical space switch will be described below which employs the polarization control optical switch 1 of Embodiment 4.

Figure 11:
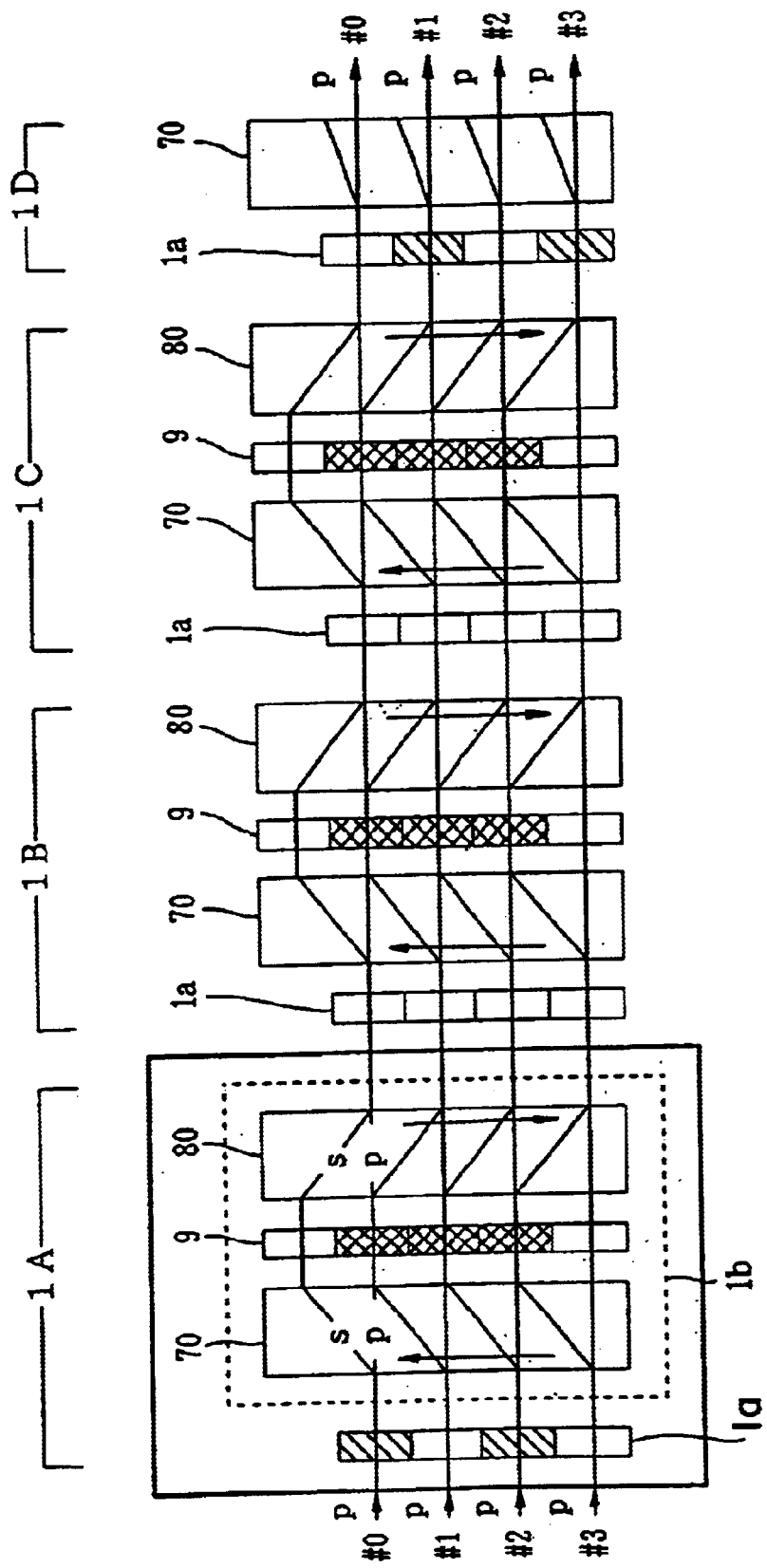
FIG. 11 is a diagram showing the hardware configuration of a polarization control optical space switch according to Embodiment 4.

FIG. 11 shows the configuration of the polarization control optical space switch according to Embodiment 4.

This polarization control optical space switch comprises four polarization control optical switches, 1A, 1B, 1C, and 1D, in cascade, thereby implementing a four-input, four-output optical space switch.

The polarization control optical switch 1A, located at the first stage as viewed from the input side, is identical in configuration to the polarization control optical switch 1 shown in FIG. 10.

The polarization control optical switches 1B and 1C, located at the second and third stages respectively, include polarization control elements PLC0–PLC3, each of which rotates the polarizing direction of incident light information through 90° when no voltage is applied, and transmits incident light information without rotating its polarizing direction when voltage is applied.

The polarization control optical switch 1D at the fourth stage consists of a polarization controller 1a and a polarized light upward routing element 70.

The polarization controller 1a consists of polarization control elements PLC0–PLC3 corresponding to the light paths #0–#3, respectively. The polarization control elements PLC0 and PLC2, positioned in the light paths #0 and #2 respectively, rotate the polarizing direction of light information through π/2 when no voltage is applied, but transmit light information without rotating its polarizing direction when voltage is applied.

The polarized light upward routing element 70 has the function of transmitting light information, incident along the light paths #0–#3, through to the respective light paths #0–#3 when the polarizing direction of the light information is p-polarization.

The operation of this polarization control optical space switch is the same as that of the foregoing Embodiment 3, and therefore, description thereof is not repeated here.

[Embodiment 5]

(Configuration of the Polarization Control Optical Space Switch)

Figure 12:
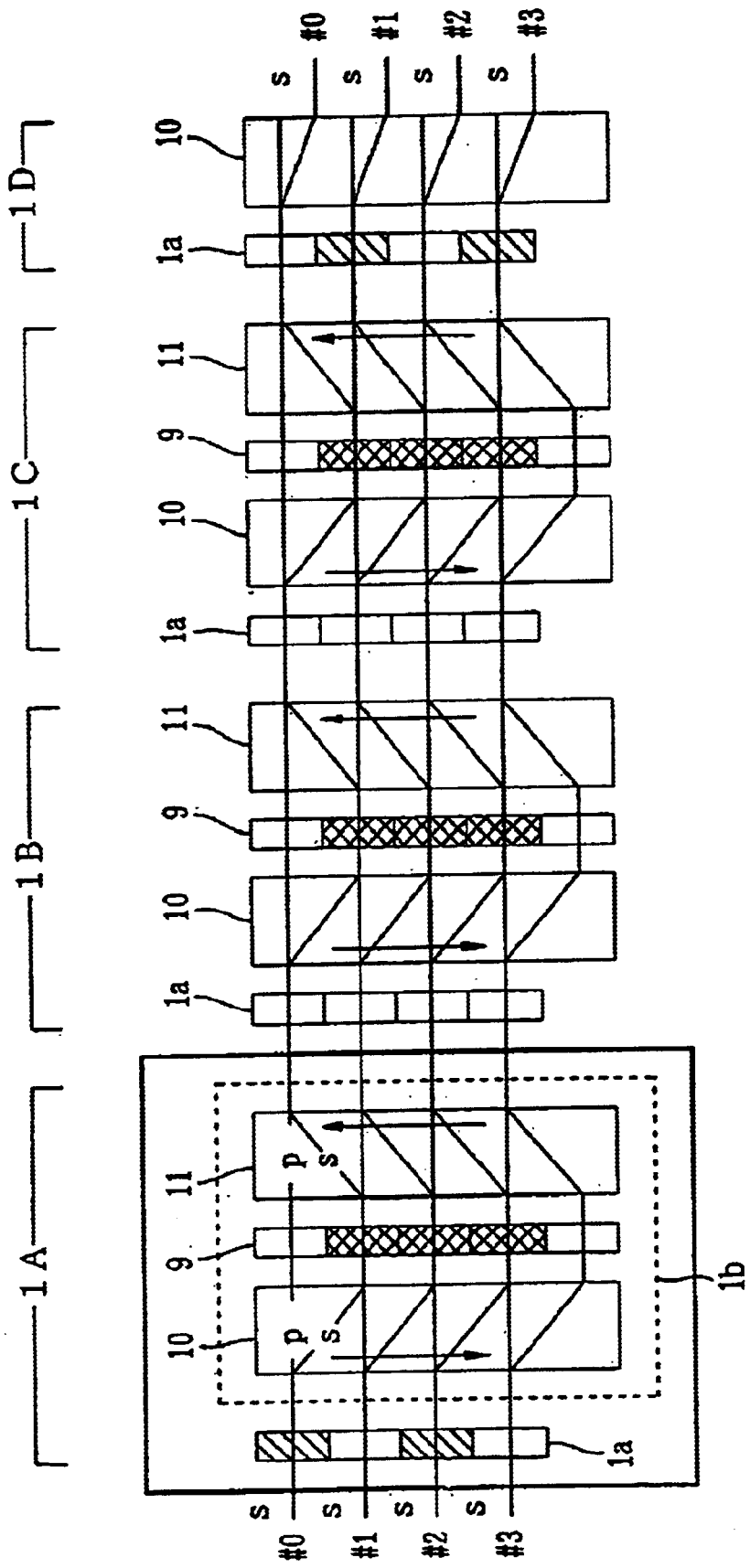
FIG. 12 is a diagram showing the hardware configuration of a polarization control optical space switch according to Embodiment 5.

FIG. 12 shows the configuration of a polarization control optical space switch according to Embodiment 5.

While the polarization control optical space switch in the foregoing Embodiment 3 is designed to set up a path for p-polarized light information, the polarization control optical space switch 1 described hereinafter is designed to set up a path for s-polarized light information.

The polarization control optical space switch 1 comprises four polarization control optical switches, 1A–1D, coupled in cascade, as in the foregoing Embodiment 3.

The polarization control optical switch 1A at the first stage consists of a polarization controller 1a and a light path routing element 1b.

As in Embodiment 3, the light path routing element 1b consists of a polarized light downward routing element 10, a λ/2 wavelength plate array 9, and a polarized light upward routing element 11. The functions of these parts are the same as those described in Embodiment 3.

The polarization controller 1a consists of polarization control elements PLC0–PLC3, one for each light path.

The polarization control elements PLC0 and PLC2, positioned in the light paths #0 and #2 respectively, are so set as to transmit light information without rotating its polarizing direction when no voltage is applied, and to rotate the polarizing direction of light information through $\pi/2$ when voltage is applied. On the other hand, the polarization control elements PLC1 and PLC3, positioned in the light paths #1 and #3 respectively, are so set as to rotate the polarizing direction of light information through $\pi/2$ when no voltage is applied, and to transmit light information without rotating its polarizing direction when voltage is applied.

The polarization control optical switch 1B at the second stage also consists of a polarization controller 1a and a light path routing element 1b.

The polarization controller 1a consists of polarization control elements PLC0–PLC3 corresponding to the light paths #0–#3, respectively. These polarization control elements PLC0–PLC3 are so set as to rotate the polarizing direction of light information through $\pi/2$ when no voltage is applied, and to transmit light information without rotating its polarizing direction when voltage is applied.

The light path routing element 1b is identical in configuration to the one used in the first-stage polarization control optical switch 1A.

The polarization control optical switch 1C at the third stage is identical in function and configuration to the second-stage polarization control optical switch 1B.

The polarization control optical switch 1D at the fourth stage consists of a polarization controller 1a and a polarized light downward routing element 10.

The polarization controller 1a in the fourth stage consists of polarization control elements PLC0–PLC3 corresponding to the light paths #0–#3 respectively.

The polarization control elements PLC0 and PLC2, positioned in the light paths #0 and #2 respectively, are so set as to rotate the polarizing direction of light information through $\pi/2$ when no voltage is applied, and to transmit light information without rotating its polarizing direction when voltage is applied. On the other hand, the polarization control elements PLC1 and PLC3, positioned in the light paths #1 and #3 respectively, are so set as to transmit light information without rotating its polarizing direction when no voltage is applied, and to rotate the polarizing direction of light information through $\pi/2$ when voltage is applied.

The polarized light downward routing element 10 has the function of transmitting light information, incident along the light paths #0–#3, through to the respective light paths #0–#3 when the polarizing direction of the light information is s-polarization.

[Embodiment 6]

(Configuration of the Polarization Control Optical Space Switch)

Figure 13:
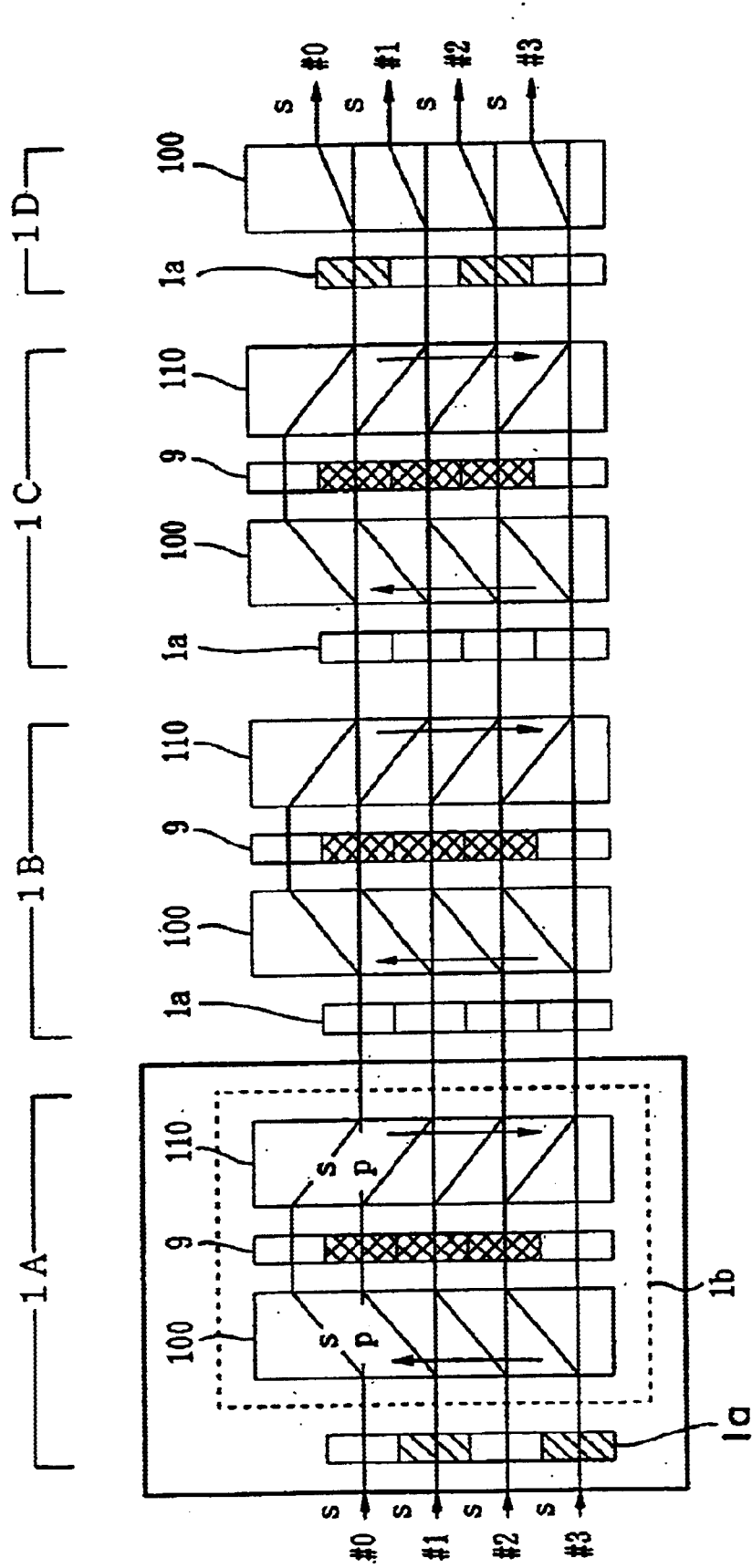
FIG. 13 is a diagram showing the hardware configuration of a polarization control optical space switch according to Embodiment 6.

FIG. 13 shows the configuration of a polarization control optical space switch according to Embodiment 6.

While the polarization control optical space switch in the foregoing Embodiment 4 is designed to set up a path for p-polarized light information, the polarization control optical space switch described hereinafter is designed to set up a path for s-polarized light information.

The polarization control optical space switch comprises four polarization control optical switches, 1A, 1B, 1C, and 1D, coupled in cascade, as in the foregoing Embodiment 4.

The polarization control optical switch 1A at the first stage consists of a polarization controller 1a and a light path routing element 1b.

As in Embodiment 4, the polarized light routing element 1b consists of a polarized light upward routing element 10, a $\lambda/2$ wavelength plate array 9, and a polarized light downward routing element 110. The functions of these parts are the same as those described in Embodiment 4.

The polarization controller 1a consists of polarization control elements PLC0–PLC3 corresponding to the light paths #0–#3 respectively.

The polarization control elements PLC0 and PLC2, positioned in the light paths #0 and #2 respectively, are so set as to rotate the polarizing direction of light information through $\pi/2$ when no voltage is applied, and to transmit light information without rotating its polarizing direction when voltage is applied.

On the other hand, the polarization control elements PLC1 and PLC3, positioned in the light paths #1 and #3 respectively, are so set as to transmit light information without rotating its polarizing direction when no voltage is applied, and to rotate the polarizing direction of light information through $\pi/2$ when voltage is applied.

The polarization control optical switch 1B at the second stage consists of a polarization controller 1a and a light path routing element 1b.

The polarization controller 1a consists of four polarization control elements PLC0–PLC3. These polarization control elements PLC0–PLC3 are so set as to rotate the polarizing direction of input light information through $\pi/2$ when no voltage is applied, and to transmit input light information without rotating its polarizing direction when voltage is applied.

The polarization control optical switch 1C at the third stage is identical in function and configuration to the second-stage polarization control optical switch 1B.

The polarization control optical switch at the fourth stage consists of a polarization controller 1a and a polarized light upward routing element 100.

The polarization controller 1a consists of polarization control elements PLC0–PLC3 corresponding to the light paths #0–#3 respectively.

The polarization control elements PLC0 and PLC2, positioned in the light paths #0 and #2 respectively, are so set as to transmit light information without rotating its polarizing direction when no voltage is applied, and to rotate the polarizing direction of light information through $\pi/2$ when voltage is applied. On the other hand, the polarization control elements PLC1 and PLC3, positioned in the light paths #1 and #3 respectively, are so set as to rotate the polarizing direction of light information through $\pi/2$ when no voltage is applied, and to transmit light information without rotating its polarizing direction when voltage is applied.

The polarized light upward routing element 100 has the function of deflecting light information, incident along the light paths #0–#3, through to the respective light paths #0–#3 when the polarizing direction of the light information is s-polarization.

In Embodiments 3 to 6, the polarized light routing element has been described as being constructed from a birefringent plate. Embodiments 7 to 10 hereinafter described each deal with an example in which a polarizing beam splitter (PBS) is used as the polarized light routing element.

[Embodiment 7]

(Configuration of the Polarization Control Optical Space Switch)

Figure 14:
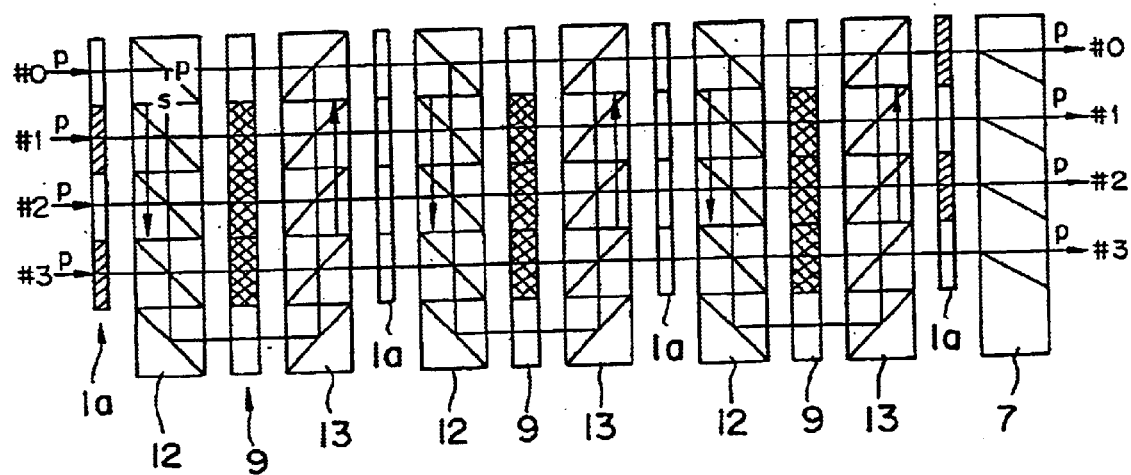
FIG. 14 is a diagram showing the hardware configuration of a polarization control optical space switch according to Embodiment 7.

FIG. 14 shows the configuration of a polarization control optical space switch according to Embodiment 7.

This polarization control optical space switch has four inputs and four outputs, and is an implementation of a switch for setting a path for light information whose polarizing direction is p-polarization, as in Embodiment 3.

The polarization control optical space switch comprises four polarization control optical switches, 1A, 1B, 1C, and 1D, in cascade, implementing a four-input, four-output optical space switch.

The polarization control optical switch 1A, located at the first stage as viewed from the input side, has four inputs and four outputs.

This polarization control optical switch 1A consists of a polarization controller 1a and a light path routing element 1b.

The polarization controller 1a consists of polarization control elements PLC0–PLC3 corresponding to the light paths #0–#3 respectively.

The polarization control elements PLC0 and PLC2, positioned in the light paths #0 and #2 respectively, are so set as to rotate the polarizing direction of input light information through π/2 when no voltage is applied, and to transmit input light information without rotating its polarizing direction when voltage is applied. On the other hand, the polarization control elements PLC1 and PLC3, positioned in the light paths #1 and #3 respectively, are so set as to transmit input light information without rotating its polarizing direction when no voltage is applied, and to rotate the polarizing direction of input light information through π/2 when voltage is applied.

The light path routing element 1b in the first stage consists of a downward polarizing beam splitter array 12, a λ/2 wavelength plate array 9, and an upward polarizing beam splitter array 13, coupled in cascade in this order from the input side.

The downward polarizing beam splitter array 12 consists of five polarizing beam splitters. The upper four polarizing beam splitters are positioned in the light paths #0–#3 respectively. The function of this downward polarizing beam splitter array 12 is such that when the polarizing direction of input light information is p-polarization, the light information is transmitted in the rectilinear forward direction, and when the polarizing direction of input light information is s-polarization, the light information is reflected into the light path one path downward. For example, s-polarized light incident along the light path #0 is reflected vertically downward by the polarizing beam splitter located in the first row. The s-polarized light is then reflected by the polarizing beam splitter in the second row and output on the light path #1.

The λ/2 wavelength plate array 9 is identical in function and configuration to the one used in Embodiment 3.

The upward polarizing beam splitter array 13 consists of five polarizing beam splitters. The upper four polarizing beam splitters are positioned in the light paths #0–#3 respectively. The function of this upward polarizing beam splitter array 13 is such that when the polarizing direction of input light information is p-polarization, the light information is transmitted in the rectilinear forward direction, and when the polarizing direction of input light information is s-polarization, the light information is reflected into the light path one path upward.

The polarization control optical switch 1B at the second stage consists of a polarization controller 1a and a light path routing element 1b.

The polarization controller 1a consists of polarization control elements PLC0–PLC3 corresponding to the light paths #0–#3 respectively. These polarization control elements PLC0–PLC3 are so set as to rotate the polarizing direction of input light information through π/2 when no voltage is applied, and to transmit input light information without rotating its polarizing direction when voltage is applied.

The light path routing element 1b is identical in configuration to the one used in the first-stage polarization control optical switch 1A.

The polarization control optical switch 1C at the third stage is identical in function and configuration to the second-stage polarization control optical switch 1B.

The polarization control optical switch 1D at the fourth stage consists of a polarization controller 1a and a downward routing element 7.

The polarization controller 1a consists of polarization control elements PLC0–PLC3 corresponding to the light paths #0–#3 respectively.

The polarization control elements PLC0 and PLC2, positioned in the light paths #0 and #2 respectively, are so set as to transmit input light information without rotating its polarizing direction when no voltage is applied, and to rotate the polarizing direction of input light information through π/2 when voltage is applied.

On the other hand, the polarization control elements PLC1 and PLC3, positioned in the light paths #1 and #3 respectively, are so set as to rotate the polarizing direction of input light information through π/2 when no voltage is applied, and to transmit input light information without rotating its polarizing direction when voltage is applied.

The downward routing element 7 is identical in configuration to the one in the fourth-stage polarization control optical switch 1D according to Embodiment 3. The downward routing element 7 has the function of transmitting light information, incident along the light paths #0–#3, through to the respective light paths #0–#3 when the polarizing direction of the light information is p-polarization.

[Embodiment 8]

(Configuration of the Polarization Control Optical Space Switch)

Figure 15:
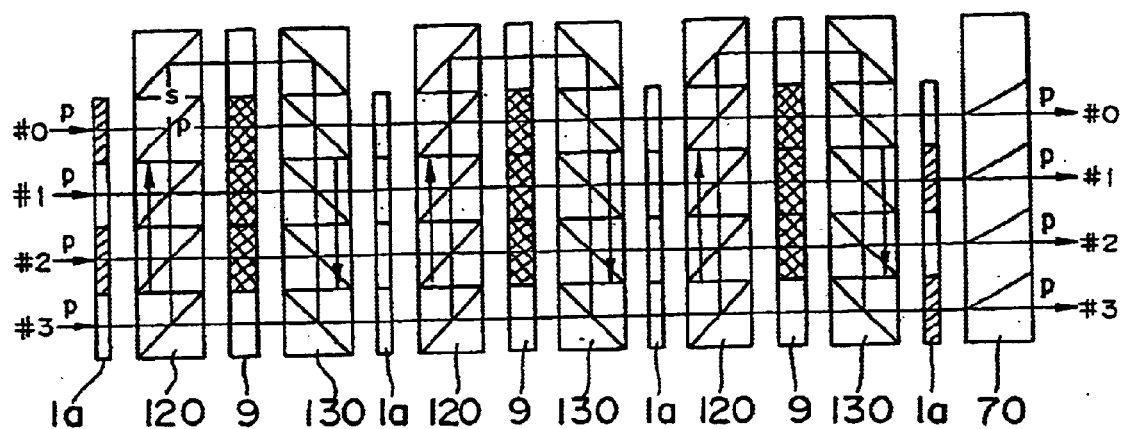
FIG. 15 is a diagram showing the hardware configuration of a polarization control optical space switch according to Embodiment 8.

FIG. 15 shows the configuration of a polarization control optical space switch according to Embodiment 8.

This polarization control optical space switch has four inputs and four outputs, and is an implementation of a switch for setting a path for light information whose polarizing direction is p-polarization, as in Embodiment 4.

The polarization control optical space switch comprises four polarization control optical switches, 1A, 1B, 1C, and 1D, in cascade, implementing a four-input, four-output optical space switch.

The polarization control optical switch 1A, located at the first stage as viewed from the input side, has four inputs and four outputs.

This first-stage polarization control optical switch 1A consists of a polarization controller 1a and a light path routing element 1b.

The polarization controller 1a consists of polarization control elements PLC0–PLC3 corresponding to the light paths #0–#3 respectively.

The polarization control elements PLC0 and PLC2, positioned in the light paths #0 and #2 respectively, are so set as to transmit input light information without rotating its polarizing direction when no voltage is applied, and to rotate the polarizing direction of input light information through π/2 when voltage is applied. On the other hand, the polarization control elements PLC1 and PLC3, positioned in the light paths #1 and #3 respectively, are so set as to rotate the polarizing direction of input light information through π/2 when no voltage is applied, and to transmit input light information without rotating its polarizing direction when voltage is applied.

The light path routing element 1b in the first stage consists of an upward polarizing beam splitter array 120, a λ/2 wavelength plate array 9, and a downward polarizing beam splitter array 130, coupled in cascade in this order from the input side.

The upward polarizing beam splitter array 120 consists of five polarizing beam splitters. Of these polarizing beam splitters, the polarizing beam splitter in the second row is positioned in the light path #0, the third-row polarizing beam splitter in the light path #1, the fourth-row polarizing beam splitter in the light path #2, and the fifth-row polarizing beam splitter in the light path #3. The function of this upward polarizing beam splitter array 120 is such that when the polarizing direction of input light information is p-polarization, the light information is transmitted in the rectilinear forward direction, and when the polarizing direction of input light information is s-polarization, the light information is reflected into the light path one path upward. For example, s-polarized light incident along the light path #0 is reflected vertically upward by the polarizing beam splitter located in the second row. The s-polarized light is then reflected by the polarizing beam splitter in the first row into a light path parallel to the light paths #0–#3.

The $\lambda/2$ wavelength plate array 9 is identical in function and configuration to the one used in Embodiment 3.

The downward polarizing beam splitter array 130 consists of five polarizing beam splitters. Of these polarizing beam splitters, the lower four polarizing beam splitters are positioned in the light paths #0–#3 respectively. The function of this downward polarizing beam splitter array 130 is such that when the polarizing direction of input light information is p-polarization, the light information is transmitted in the rectilinear forward direction, and when the polarizing direction of input light information is s-polarization, the light information is reflected into the light path one path downward.

The polarization control optical switch 1B at the second stage consists of a polarization controller 1a and a light path routing element 1b. The polarization controller 1a consists of polarization control elements PLC0–PLC3 corresponding to the light paths #0–#3 respectively. These polarization control elements PLC0–PLC3 are so set as to rotate the polarizing direction of input light information through $\pi/2$ when no voltage is applied, and to transmit input light information without rotating its polarizing direction when voltage is applied. The light path routing element 1b in the second stage is identical in configuration and function to the one used in the first-stage polarization control optical switch 1A.

The polarization control optical switch 1C at the third stage is identical in function and configuration to the second-stage polarization control optical switch 1B.

The polarization control optical switch 1D at the fourth stage consists of a polarization controller 1a and an upward routing element 70. The polarization controller 1a consists of polarization control elements PLC0–PLC3 corresponding to the light paths #0–#3 respectively.

The polarization control elements PLC0 and PLC2, positioned in the light paths #0 and #2 respectively, are so set as to rotate the polarizing direction of input light information through $\pi/2$ when no voltage is applied, and to transmit input light information without rotating its polarizing direction when voltage is applied. On the other hand, the polarization control elements PLC1 and PLC3, positioned in the light paths #1 and #3 respectively, are so set as to transmit input light information without rotating its polarizing direction when no voltage is applied, and to rotate the polarizing direction of input light information through $\pi/2$ when voltage is applied.

The upward routing element 70 has the function of transmitting light information, incident along the light paths #0–#3, through to the respective light paths #0–#3 when the polarizing direction of the light information is p-polarization.

[Embodiment 9]

(Configuration of the Polarization Control Optical Space Switch)

Figure 16:
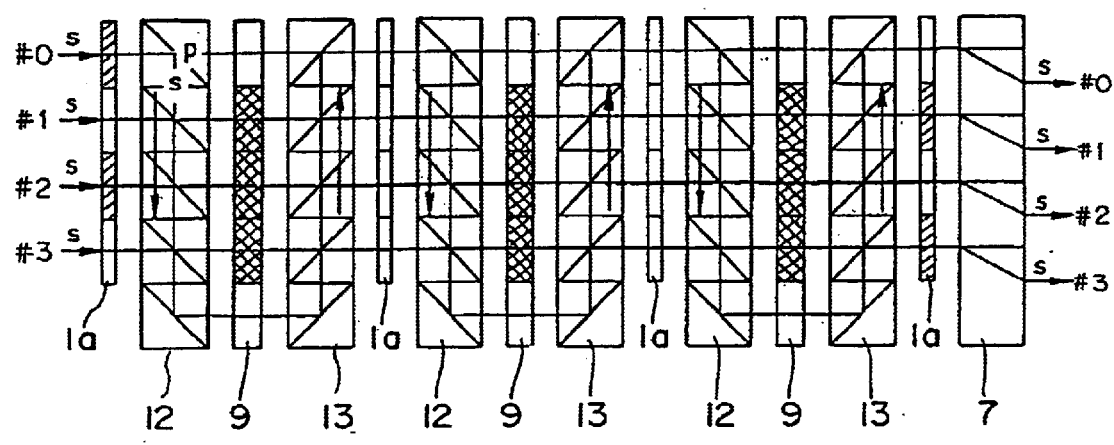
FIG. 16 is a diagram showing the hardware configuration of a polarization control optical space switch according to Embodiment 9.

FIG. 16 shows the configuration of a polarization control optical space switch according to Embodiment 9.

This polarization control optical space switch has four inputs and four outputs, and is an implementation of a switch for setting a path for light information whose polarizing direction is s-polarization.

The polarization control optical space switch comprises four polarization control optical switches, 1A, 1B, 1C, and 1D, in cascade, implementing a four-input, four-output optical space switch.

The polarization control optical switch 1A, located at the first stage as viewed from the input side, has four inputs and four outputs. This polarization control optical switch 1A consists of a polarization controller 1a and a light path routing element 1b.

The polarization controller 1a consists of polarization control elements PLC0–PLC3 corresponding to the light paths #0–#3 respectively. The polarization control elements PLC0 and PLC2, positioned in the light paths #0 and #2 respectively, are so set as to retain the polarizing direction of input light information when no voltage is applied, and to rotate the polarizing direction of input light information through $\pi/2$ when voltage is applied. On the other hand, the polarization control elements PLC1 and PLC3, positioned in the light paths #1 and #3 respectively, are so set as to rotate the polarizing direction of input light information through $\pi/2$ when no voltage is applied, and to retain the polarizing direction of input light information when voltage is applied.

The light path routing element 1b in the first stage consists of a downward polarizing beam splitter array 12, a $\lambda/2$ wavelength plate array 9, and an upward polarizing beam splitter array 13, coupled in cascade in this order from the input side. The functions and configurations of these parts are the same as those described in Embodiment 7.

The polarization control optical switch 1B at the second stage consists of a polarization controller 1a and a light path routing element 1b. The polarization controller 1a consists of polarization control elements PLC0–PLC3, one for each path. These polarization control elements PLC0–PLC3 are so set as to rotate the polarizing direction of input light information through $\pi/2$ when no voltage is applied, and to retain the polarizing direction of input light information when voltage is applied. This light path routing element 1b is identical in configuration and function to the one used in the first-stage polarization control optical switch 1A.

The polarization control optical switch 1C at the third stage is identical in function and configuration to the second-stage polarization control optical switch 1B.

The polarization control optical switch 1D at the fourth stage consists of a polarization controller 1a and a downward routing element 7.

The polarization controller 1a consists of polarization control elements PLC0–PLC3 corresponding to the light paths #0–#3 respectively. The polarization control elements PLC0 and PLC2, positioned in the light paths #0 and #2 respectively, are so set as to rotate the polarizing direction of input light information through $\pi/2$ when no voltage is applied, and to retain the polarizing direction of input light information when voltage is applied. On the other hand, the polarization control elements PLC1 and PLC3, positioned in the light paths #1 and #3 respectively, are so set as to retain the polarizing direction of input light information when no voltage is applied, and to rotate the polarizing direction of input light information through $\pi/2$ when voltage is applied.

The downward routing element 7 has the function of deflecting light information, incident along the light paths #0–#3S into the respective light paths #0–#3 when the polarizing direction of the light information is s-polarization.

[Embodiment 10]

(Configuration of the Polarization Control Optical Space Switch)

Figure 17:
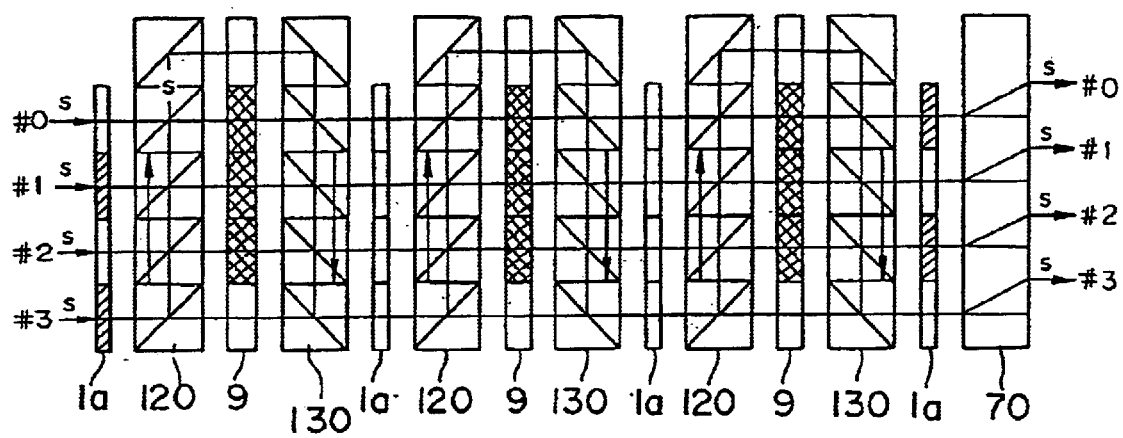
FIG. 17 is a diagram showing the hardware configuration of a polarization control optical space switch according to Embodiment 10.

FIG. 17 shows the configuration of a polarization control optical space switch according to Embodiment 10.

This polarization control optical space switch has four inputs and four outputs, and is an implementation of a switch for setting a path for light information whose polarizing direction is s-polarization, as in Embodiment 6.

The polarization control optical space switch comprises four polarization control optical switches, 1A, 1B, 1C, and 1D, in cascade, implementing a four-input, four-output optical space switch.

The polarization control optical switch 1A, located at the first stage as viewed from the input side, has four inputs and four outputs.

This first-stage polarization control optical switch 1A consists of a polarization controller 1a and a light path routing element 1b.

The polarization controller 1a consists of polarization control elements PLC0–PLC3 corresponding to the light paths #0–#3 respectively. The polarization control elements PLC0 and PLC2, positioned in the light paths #0 and #2 respectively, are so set as to rotate the polarizing direction of input light information through $\pi/2$ when no voltage is applied, and to retain the polarizing direction of input light information when voltage is applied. On the other hand, the polarization control elements PLC1 and PLC3, positioned in the light paths #1 and #3 respectively, are so set as to retain the polarizing direction of input light information when no voltage is applied, and to rotate the polarizing direction of input light information through $\pi/2$ when voltage is applied.

The light path routing element 1b in the first stage is identical in configuration and function to the one described in Embodiment 8.

The polarization control optical switch 1B at the second stage consists of a polarization controller 1a and a light path routing element 1b.

The polarization controller 1a consists of polarization control elements PLC0–PLC3 corresponding to the light paths #0–#3 respectively. These polarization control elements PLC0–PLC3 are so set as to rotate the polarizing direction of input light information through $\pi/2$ when no voltage is applied, and to retain the polarizing direction of input light information when voltage is applied. This light path routing element 1b is identical in configuration and function to the one used in the first-stage polarization control optical switch 1A.

The polarization control optical switch 1C at the third stage is identical in function and configuration to the second-stage polarization control optical switch 1B.

The polarization control optical switch 1D at the fourth stage consists of a polarization controller 1a and an upward routing element 70.

The polarization controller 1a consists of polarization control elements PLC0–PLC3 corresponding to the light paths #0–#3 respectively. The polarization control elements PLC0 and PLC2, positioned in the light paths #0 and #2 respectively, are so set as to retain the polarizing direction of input light information when no voltage is applied, and to rotate the polarizing direction of input light information through $\pi/2$ when voltage is applied. On the other hand, the polarization control elements PLC1 and PLC3, positioned in the light paths #1 and #3 respectively, are so set as to rotate the polarizing direction of input light information through $\pi/2$ when no voltage is applied, and to retain the polarizing direction of input light information when voltage is applied.

The upward routing element 70 has the function of deflecting light information, incident along the light paths #0–#3, into the respective light paths #0–#3 when the polarizing direction of the light information is s-polarization.

In the above Embodiments 7 to 10, the polarized light routing element has been described as being constructed from a polarizing beam splitter (PBS). Embodiments 11 to 14 hereinafter described each deal with an example in which a liquid-crystal hologram is used as the polarized light routing element.

[Embodiment 11]

(Configuration of the Polarization Control Optical Space Switch)

Figure 18:
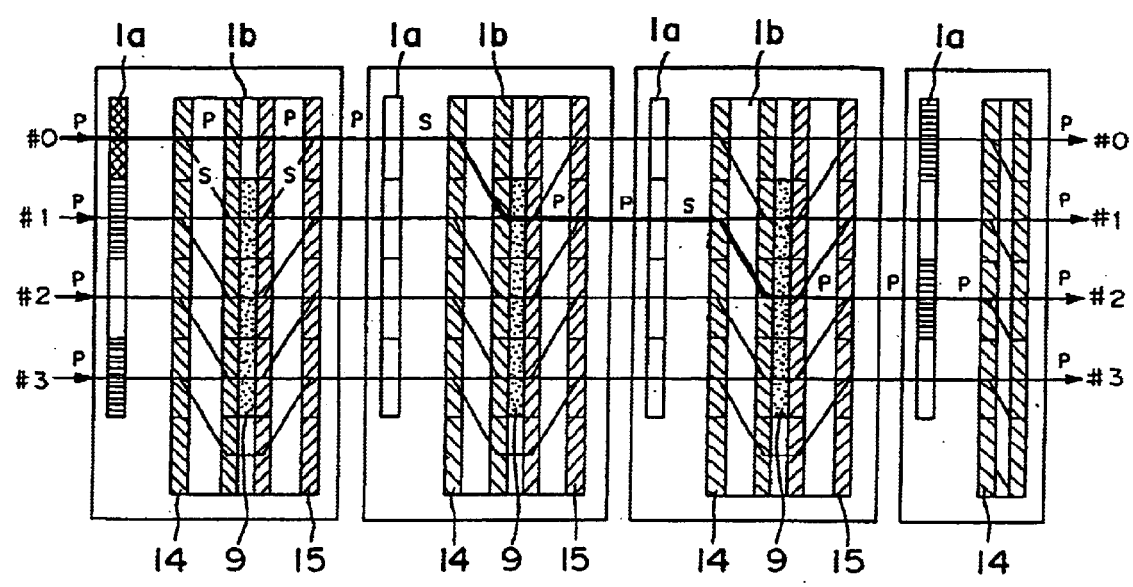
FIG. 18 is a diagram showing the hardware configuration of a polarization control optical space switch according to Embodiment 11.

FIG. 18 shows the configuration of a polarization control optical space switch according to Embodiment 11.

This polarization control optical space switch has four inputs and four outputs, and is an implementation of a switch for setting a path for light information whose polarizing direction is p-polarization, as in Embodiment 7.

The polarization control optical space switch comprises four polarization control optical switches, 1A, 1B, 1C, and 1D, in cascade.

The polarization control optical switch 1A, located at the first stage as viewed from the input side, has four inputs and four outputs.

This first-stage polarization control optical switch 1A consists of a polarization controller 1a and a light path routing element 1b.

The polarization controller 1a consists of polarization control elements PLC0–PLC3 corresponding to the light paths #0–#3 respectively. The polarization control elements PLC0 and PLC2, positioned in the light paths #0 and #2 respectively, are so set as to rotate the polarizing direction of input light information through $\pi/2$ when no voltage is applied, and to retain the polarizing direction of input light information when voltage is applied. On the other hand, the polarization control elements PLC1 and PLC3, positioned in the light paths #1 and #3 respectively, are so set as to retain the polarizing direction of input light information when no voltage is applied, and to rotate the polarizing direction of input light information through $\pi/2$ when voltage is applied.

The light path routing element 1b in the first stage consists of a downward liquid-crystal hologram 14, a $\lambda/2$ wavelength plate array 9, and an upward liquid-crystal hologram 15, coupled in cascade in this order from the input side.

The function of the downward liquid-crystal hologram 14 is such that when the polarizing direction of input light information is p-polarization, the light information is transmitted in the rectilinear forward direction, and when the polarizing direction of input light information is s-polarization, the light information is shifted to the light path one path downward.

The $\lambda/2$ wavelength plate array 9 is identical in function and configuration to the one used in Embodiment 7.

The function of the upward liquid-crystal hologram 15 is such that when the polarizing direction of input light information is p-polarization, the light information is transmitted in the rectilinear forward direction, and when the polarizing direction of input light information is s-polarization, the light information is shifted to the light path one path upward.

The polarization control optical switch 1B at the second stage consists of a polarization controller 1a and a light path routing element 1b. The polarization controller 1a consists of polarization control elements PLC0–PLC3 corresponding to the light paths #0–#3 respectively. These polarization control elements PLC0–PLC3 are so set as to rotate the polarizing direction of input light information through π/2 when no voltage is applied, and to retain the polarizing direction of input light information when voltage is applied.

The light path routing element 1b is identical in configuration and function to the one used in the first-stage polarization control optical switch 1A.

The polarization control optical switch 1C at the third stage is identical in function and configuration to the second-stage polarization control optical switch 1B.

The polarization control optical switch 1D at the fourth stage consists of a polarization controller 1a and a downward liquid-crystal hologram 14.

The polarization controller 1a consists of polarization control elements PLC0–PLC3 corresponding to the light paths #0–#3 respectively. The polarization control elements PLC0 and PLC2, positioned in the light paths #0 and #2 respectively, are so set as to retain the polarizing direction of input light information when no voltage is applied, and to rotate the polarizing direction of input light information through π/2 when voltage is applied. On the other hand, the polarization control elements PLC1 and PLC3, positioned in the light paths #1 and #3 respectively, are so set as to rotate the polarizing direction of input light information through π/2 when no voltage is applied, and to retain the polarizing direction of input light information when voltage is applied.

The downward liquid-crystal hologram 14 has the function of transmitting light information, incident along the light paths #0–#3, through to the respective light paths #0–#3 when the polarizing direction of the light information is p-polarization. As an alternative, the fourth-stage polarization control optical switch 1D may be constructed with a polarization controller 1a and an upward liquid-crystal hologram 15.

(Operation of the Polarization Control Optical Space Switch)

The operation of the polarization control optical space switch in Embodiment 11 will be described below.

The following description deals with the operation of the polarization control optical space switch when setting a path between the input light path #0 and the output light path #2.

In the functional configuration of FIG. 2, when setting a path between the input light path #0 and the output light path #2, the switch element S02 located at the first column in the first row is switched from the cross to the bar state. Accordingly, in the hardware configuration shown in FIG. 18, voltage is applied to the polarization control element PLC0 located in the first row of the polarization controller 1a in the first stage of the polarization control optical space switch.

The p-polarized light incident along the light path #0 first enters the polarization control optical switch 1A at the first stage.

In the first-stage polarization control optical switch 1A, the p-polarized light enters the polarization control element PLC0.

Since the polarization control element PLC0 is in the energized state, the incident p-polarized light is allowed to pass through it without change and enter the downward liquid-crystal hologram 14 in the light path routing element 1b.

The downward liquid-crystal hologram 14 transmits the p-polarized light in the rectilinear forward direction through to the λ/2 wavelength plate array 9.

Since the λ/2 wavelength plate array 9 has a light-transmitting member located at the position corresponding to the light path #0, the p-polarized light is transmitted in the rectilinear forward direction and enters the upward liquid-crystal hologram 15.

The upward liquid-crystal hologram 15 transmits the p-polarized light in the rectilinear forward direction through to the second-stage polarization control optical switch 1B.

In the second-stage polarization control optical switch 1B, the p-polarized light incident along the light path #0 enters the polarization control element PLC0.

The polarization control element PLC0 rotates the p-polarized light incident along the light path #0, to convert it into s-polarized light, which is input into the light path routing element 1b.

In the light path routing element 1b in the second stage, the s-polarized light incident along the light path #0 enters the downward liquid-crystal hologram 14.

The downward liquid-crystal hologram 14 shifts the light path for the s-polarized light from the light path #0 downward by one path, i.e., to the light path #1, along which the s-polarized light enters the λ/2 wavelength plate array 9.

Since the λ/2 wavelength plate array 9 has a λ/2 wavelength plate at the position corresponding to the light path #1, the s-polarized light is rotated and converted into p-polarized light, which is input into the upward liquid-crystal hologram 15.

The upward liquid-crystal hologram 15 transmits the p-polarized light, incident along the light path #1, in the rectilinear forward direction through to the third-stage polarization control optical switch 1C.

In the third-stage polarization control optical switch 1C, the p-polarized light incident along the light path #1 enters the polarization control element PLC1.

The polarization control element PLC1 rotates the p-polarized light incident along the light path #1, to convert it into s-polarized light, which is input into the light path routing element 1b in the third stage.

In the light path routing element 1b in the third stage, the s-polarized light incident along the light path #1 enters the downward liquid-crystal hologram 14.

The downward liquid-crystal hologram 14 shifts the light path for the s-polarized light from the light path #1 downward by one path, i.e., to the light path #2, along which the s-polarized light enters the λ/2 wavelength plate array 9.

Since the λ/2 wavelength plate array 9 has a λ/2 wavelength plate at the position corresponding to the light path #2, the s-polarized light is rotated and converted into p-polarized light, which is input into the upward liquid-crystal hologram 15.

The upward liquid-crystal hologram 15 transmits the p-polarized light, incident along the light path #2, in the rectilinear forward direction through to the fourth-stage polarization control optical switch 1D.

In the fourth-stage polarization control optical switch 1D, the p-polarized light incident along the light path #2 enters the polarization control element PLC2.

The polarization control element PLC2 transmits the p-polarized light without change, to the downward liquid-crystal hologram 14.

The downward liquid-crystal hologram 14 transmits the p-polarized light, incident along the light path #2, in the rectilinear forward direction, thus outputting the p-polarized light on the output light path #2.

[Embodiment 12]

(Configuration of the Polarization Control Optical Space Switch)

Figure 19:
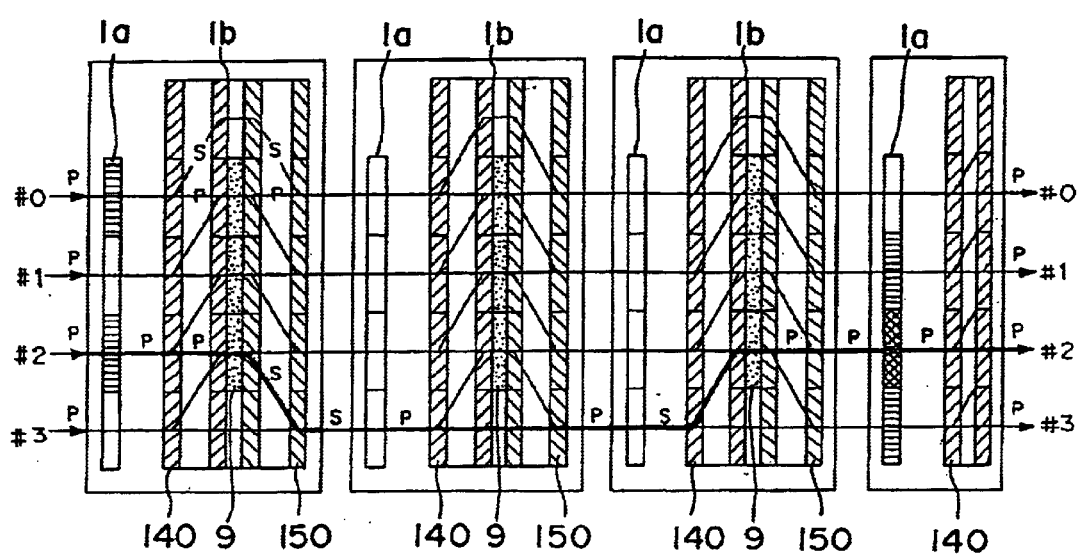
FIG. 19 is a diagram showing the hardware configuration of a polarization control optical space switch according to Embodiment 12.

FIG. 19 shows the configuration of a polarization control optical space switch according to Embodiment 12.

This polarization control optical space switch has four inputs and four outputs, and is an implementation of a switch for setting a path for light information whose polarizing direction is p-polarization, as in Embodiment 8.

The polarization control optical space switch comprises four polarization control optical switches, 1A, 1B, 1C, and 1D, in cascade.

The polarization control optical switch 1A at the first stage has four inputs and four outputs.

This first-stage polarization control optical switch 1A consists of a polarization controller 1a and a light path routing element 1b.

The polarization controller 1a consists of polarization control elements PLC0–PLC3 corresponding to the light paths #0–#3 respectively. The polarization control elements PLC0 and PLC2, positioned in the light paths #0 and #2 respectively, are so set as to retain the polarizing direction of input light information when no voltage is applied, and to rotate the polarizing direction of input light information through $\pi/2$ when voltage is applied. On the other hand, the polarization control elements PLC1 and PLC3, positioned in the light paths #1 and #3 respectively, are so set as to rotate the polarizing direction of input light information through $\pi/2$ when no voltage is al applied, and to retain the polarizing direction of input light information when voltage is applied.

The light path routing element 1b in the first stage consists of an upward liquid-crystal hologram 140, a $\lambda/2$ wavelength plate array 9, and a downward liquid-crystal hologram 150, coupled in cascade.

The function of the upward liquid-crystal hologram 140 is such that when the polarizing direction of input light information is p-polarization, the light information is transmitted in the rectilinear forward direction, and when the polarizing direction of input light information is s-polarization, the light information is shifted to the light path one path upward.

The $\lambda/2$ wavelength plate array 9 is identical in function and configuration to the one used in Embodiment 8.

The function of the downward liquid-crystal hologram 150 is such that when the polarizing direction of input light information is p-polarization, the light information is transmitted in the rectilinear forward direction, and when the polarizing direction of input light information is s-polarization, the light information is shifted to the light path one path downward.

The polarization control optical switch 1B at the second stage consists of a polarization controller 1a and a light path routing element 1b. The polarization controller 1a consists of polarization control elements PLC0–PLC3 corresponding to the light paths #0–#3 respectively. These polarization control elements PLC0–PLC3 are so set as to rotate the polarizing direction of input light information through $\pi/2$ when no voltage is applied, and to retain the polarizing direction of input light information when voltage is applied.

The light path routing element 1b is identical in configuration and function to the one used in the first-stage polarization control optical switch 1A.

The polarization control optical switch 1C at the third stage is identical in function and configuration to the second-stage polarization control optical switch 1B.

The polarization control optical switch 1D at the fourth stage consists of a polarization controller 1a and an upward liquid-crystal hologram 140.

The polarization controller 1a consists of polarization control elements PLC0–PLC3 corresponding to the light paths #0–#3 respectively. The polarization control elements PLC0 and PLC2, positioned in the light paths #0 and #2 respectively, are so set as to rotate the polarizing direction of input light information through $\pi/2$ when no voltage is applied, and to retain the polarizing direction of input light information when voltage is applied. On the other hand, the polarization control elements PLC1 and PLC3, positioned in the light paths #1 and #3 respectively, are so set as to retain the polarizing direction of input light information when no voltage is applied, and to rotate the polarizing direction of input light information through $\pi/2$ when voltage is applied.

The upward liquid-crystal hologram 140 has the function of transmitting light information, incident along the light paths #0–#3, through to the respective light paths #0–#3 when the polarizing direction of the light information is p-polarization.

As an alternative, the fourth-stage polarization control optical switch 1D may be constructed with a polarization controller 1a and a downward liquid-crystal hologram 150.

[Embodiment 13]

(Configuration of the Polarization Control Optical Space Switch)

Figure 20:
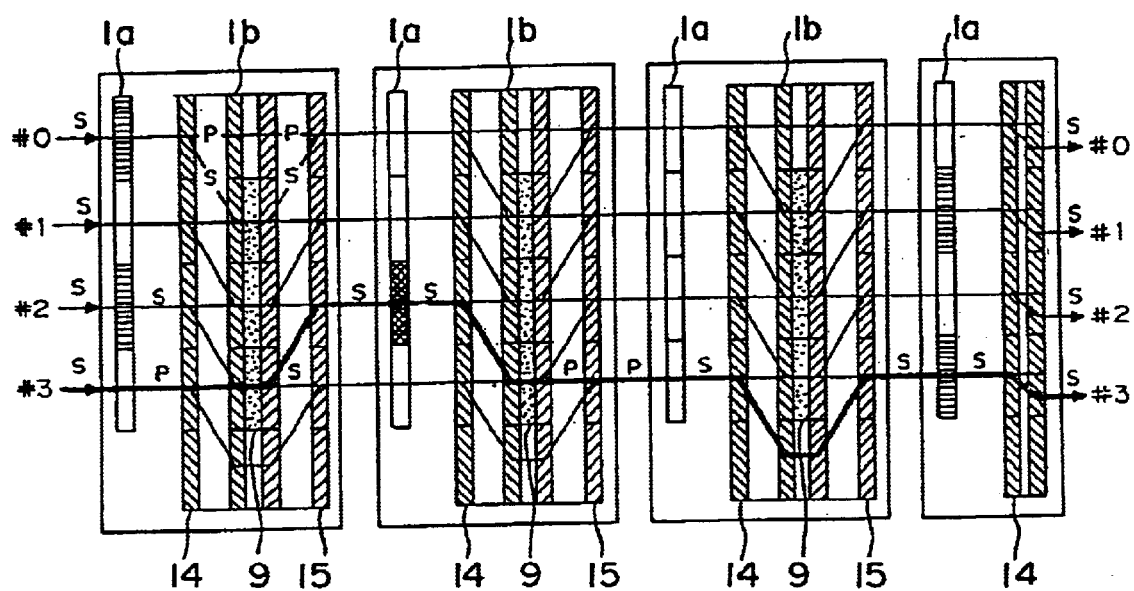
FIG. 20 is a diagram showing the hardware configuration of a polarization control optical space switch according to Embodiment 13.

FIG. 20 shows the configuration of a polarization control optical space switch according to Embodiment 13.

This polarization control optical space switch has four inputs and four outputs, and is an implementation of a switch for setting a path for light information whose polarizing direction is s-polarization, as in Embodiment 9.

The polarization control optical space switch comprises four polarization control optical switches, 1A, 1B, 1C, and 1D, in cascade.

The polarization control optical switch 1A at the first stage has four inputs and four outputs.

This first-stage polarization control optical switch 1A consists of a polarization controller 1a and a light path routing element 1b.

The polarization controller 1a consists of polarization control elements PLC0–PLC3 corresponding to the light paths #0–#3 respectively. The polarization control elements PLC0 and PLC2, positioned in the light paths #0 and #2 respectively, are so set as to retain the polarizing direction of input light information when no voltage is applied, and to rotate the polarizing direction of input light information through $\pi/2$ when voltage is applied. On the other hand, the polarization control elements PLC1 and PLC3, positioned in the light paths #1 and #3 respectively, are so set as to rotate the polarizing direction of input light information through $\pi/2$ when no voltage is applied, and to retain the polarizing direction of input light information when voltage is applied.

The light path routing element 1b in the first stage consists of a downward liquid-crystal hologram 14, a $\lambda/2$ wavelength plate array 9, and an upward liquid-crystal hologram 15, coupled in cascade in this order from the input side.

The function of the downward liquid-crystal hologram 14 is such that when the polarizing direction of input light information is p-polarization, the light information is transmitted in the rectilinear forward direction, and when the polarizing direction of input light information is s-polarization, the light information is shifted to the light path one path downward.

The $\lambda/2$ wavelength plate array 9 is identical in function and configuration to the one used in Embodiment 9.

The function of the upward liquid-crystal hologram 15 is such that when the polarizing direction of input light information is p-polarization, the light information is transmitted in the rectilinear forward direction, and when the polarizing direction of input light information is s-polarization, the light information is shifted to the light path one path upward.

The polarization control optical switch 1B at the second stage consists of a polarization controller 1a and a light path routing element 1b. The polarization controller 1a consists of polarization control elements PLC0–PLC3 corresponding to the light paths #0–#3 respectively. These polarization control elements PLC0–PLC3 are so set as to rotate the polarizing direction of input light information through $\pi/2$ when no voltage is applied, and to retain the polarizing direction of input light information when voltage is applied.

The light path routing element 1b in the second stage is identical in configuration and function to the one used in the first-stage polarization control optical switch 1A.

The polarization control optical switch 1C at the third stage is identical in function and configuration to the second-stage polarization control optical switch 1B.

The polarization control optical switch 1D at the fourth stage consists of a polarization controller 1a and a downward liquid-crystal hologram 14.

The polarization controller 1a consists of polarization control elements PLC0–PLC3 corresponding to the light paths #0–#3 respectively. The polarization control elements PLC0 and PLC2, positioned in the light paths #0 and #2 respectively, are so set as to rotate the polarizing direction of input light information through $\pi/2$ when no voltage is applied, and to retain the polarizing direction of input light information when voltage is applied. On the other hand, the polarization control elements PLC1 and PLC3, positioned in the light paths #1 and #3 respectively, are so set as to retain the polarizing direction of input light information when no voltage is applied, and to rotate the polarizing direction of input light information through $\pi/2$ when voltage is applied.

The downward liquid-crystal hologram 14 has the function of deflecting light information, incident along the light paths #0–#3, into the respective light paths #0–#3 when the polarizing direction of the light information is s-polarization. As an alternative, the fourth-stage polarization control optical switch 1D may be constructed with a polarization controller 1a and an upward liquid-crystal hologram 15.

[Embodiment 14]

(Configuration of the Polarization Control optical Space Switch)

Figure 21:
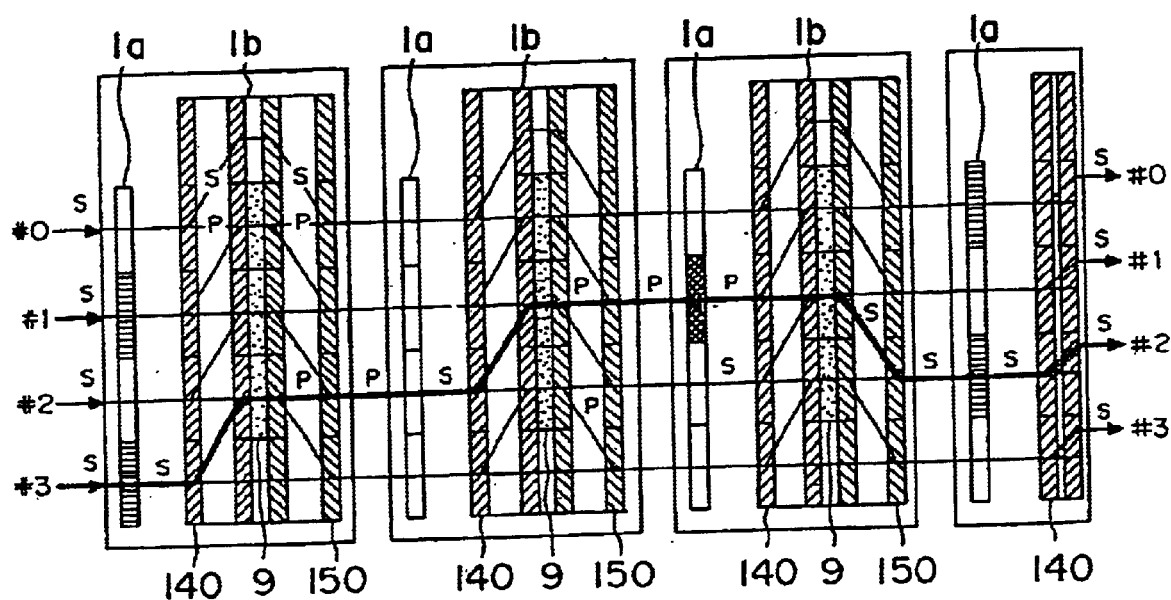
FIG. 21 is a diagram showing the hardware configuration of a polarization control optical space switch according to Embodiment 14.

FIG. 21 shows the configuration of a polarization control optical space switch according to Embodiment 14.

This polarization control optical space switch has four inputs and four outputs, and is an implementation of a switch for setting a path for light information whose polarizing direction is s-polarization, as in Embodiment 10.

The polarization control optical space switch comprises four polarization control optical switches, 1A, 1B, 1C, and 1D, in cascade.

The polarization control optical switch 1A at the first stage has four inputs and four outputs.

This first-stage polarization control optical switch 1A consists of a polarization controller 1a and a light path routing element 1b.

The polarization controller 1a consists of polarization control elements PLC0–PLC3 corresponding to the light paths #0–#3 respectively.

The polarization control elements PLC0 and PLC2, positioned in the light paths #0 and #2 respectively, are so set as to rotate the polarizing direction of input light information through $\pi/2$ when no voltage is applied, and to retain the polarizing direction of input light information when voltage is applied.

On the other hand, the polarization control elements PLC1 and PLC3, positioned in the light paths #1 and #3 respectively, are so set as to retain the polarizing direction of input light information when no voltage is applied, and to rotate the polarizing direction of input light information through $\pi/2$ when voltage is applied.

The light path routing element 1b in the first stage consists of an upward liquid-crystal hologram 140, a $\lambda/2$ wavelength plate array 9, and a downward liquid-crystal hologram 150, coupled in cascade in this order from the input side.

The function of the upward liquid-crystal hologram 140 is such that when the polarizing direction of input light information is p-polarization, the light information is transmitted in the rectilinear forward direction, and when the polarizing direction of input light information is s-polarization, the light information is shifted to the light path one path upward.

The $\lambda/2$ wavelength plate array 9 is identical in function and configuration to the one used in Embodiment 10.

The function of the downward liquid-crystal hologram 150 is such that when the polarizing-direction of input light information is p-polarization, the light information is transmitted in the rectilinear forward direction, and when the polarizing direction of input light information is s-polarization, the light information is shifted to the light path one path downward.

The polarization control optical switch 1B at the second stage consists of a polarization controller 1a and a light path routing element 1b.

The polarization controller 1a consists of polarization control elements PLC0–PLC3 corresponding to the light paths #0–#3 respectively. These polarization control elements PLC0–PLC3 are so set as to rotate the polarizing direction of input light information through $\pi/2$ when no voltage is applied, and to retain the polarizing direction of input light information when voltage is applied.

The light path routing element 1b in the second stage is identical in configuration and function to the one used in the first-stage polarization control optical switch 1A.

The polarization control optical switch 1C at the third stage is identical in function and configuration to the second-stage polarization control optical switch 1B.

The polarization control optical switch 1D at the fourth stage consists of a polarization controller 1a and an upward liquid-crystal hologram 140.

The polarization controller 1a consists of polarization control elements PLC0–PLC3 corresponding to the light paths #0–#3 respectively.

The polarization control elements PLC0 and PLC2, positioned in the light paths #0 and #2 respectively, are so set as to retain the polarizing direction of input light information when no voltage is applied, and to rotate the polarizing direction of input light information through $\pi/2$ when voltage is applied.

On the other hand, the polarization control elements PLC1 and PLC3, positioned in the light paths #1 and #3 respectively, are so set as to rotate the polarizing direction of input light information through $\pi/2$ when no voltage is applied, and to retain the polarizing direction of input light information when voltage is applied.

The upward liquid-crystal hologram 140 has the function of deflecting light information, incident along the light paths #0–#3, into the respective light paths #0–#3 when the polarizing direction of the light information is s-polarization.

As an alternative, the fourth-stage polarization control optical switch 1D may be constructed with a polarization controller 1a and a downward liquid-crystal hologram 150.

Embodiments 1 to 14 each have dealt with a polarization control optical space switch. In Embodiments 15 to 22 hereinafter described, polarization control optical space switches are constructed in modules, and a plurality of polarization control optical space switch modules are combined to realize a space-division optical switching network.

[Embodiment 15]

(Configuration of the Space-division Optical Switching Network)

Figure 22:
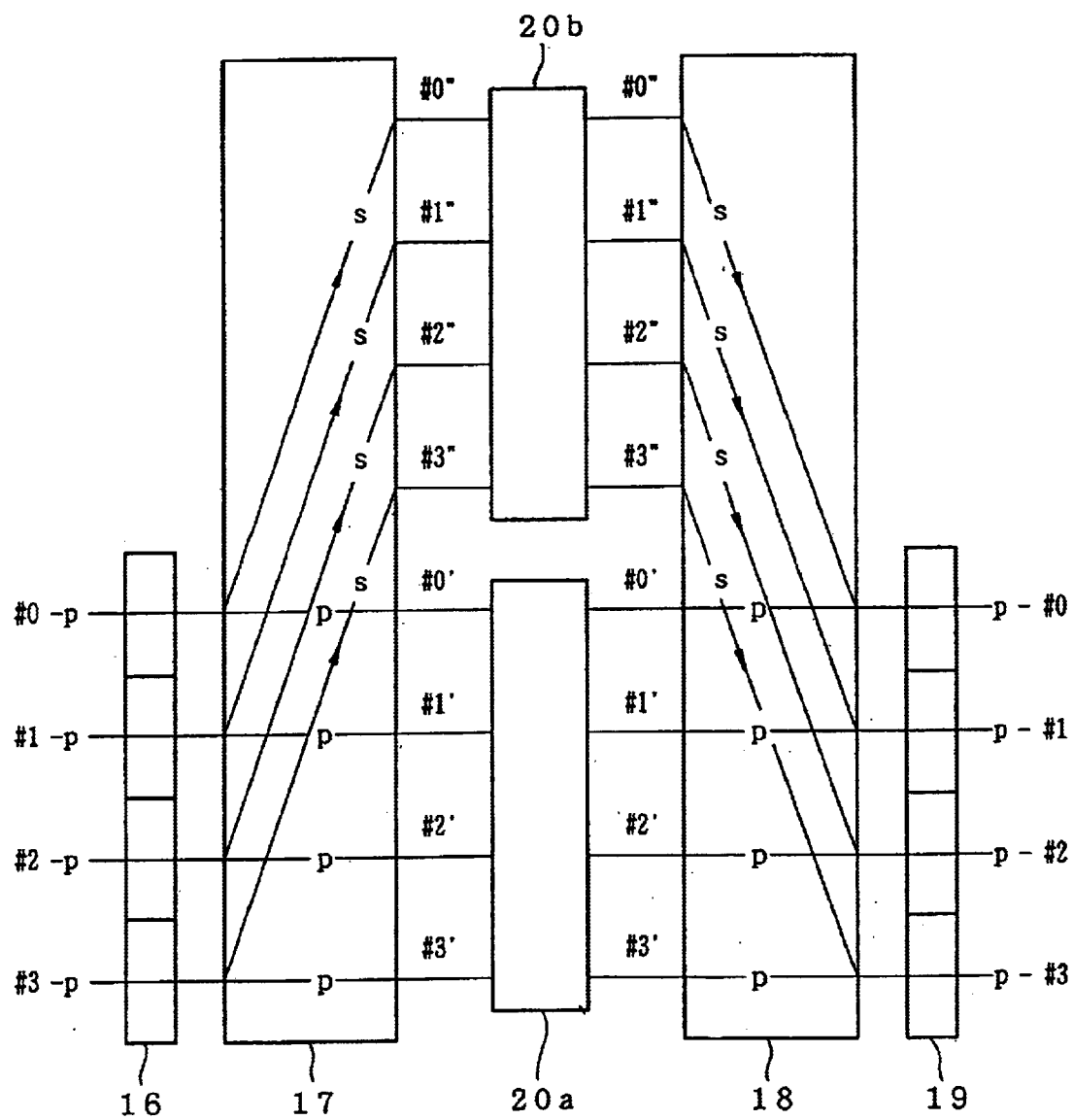
FIG. 22 is a diagram showing the configuration of a space-division optical switching network according to Embodiment 15.

FIG. 22 shows the configuration of a space-division optical switching network according to Embodiment 15.

This space-division optical switching network uses a four-input, four-output s-polarization control optical space switch 20b in combination with a four-input, four-output p-polarization control optical space switch 20a, to realize a four-input, four-output optical switching network.

The space-division optical switching network comprises a polarization controller 16, a birefringent plate 17, a polarization control optical space switch block 20, a birefringent plate 18, and a polarization controller 19, coupled in cascade in this order from the input side.

The polarization control optical space switch block 20 consists of the s-polarization control optical space switch 20b and p-polarization control optical space switch 20a, arranged one above the other in parallel fashion. More specifically, the s-polarization control optical space switch 20b is located in the upper half, and the p-polarization control optical space switch 20a located in the lower half of the polarization control optical space switch block 20.

The s-polarization control optical space switch 20b is a four-input, four-output switch, designed to set up a path for light information whose polarizing direction is s-polarization.

The p-polarization control optical space switch 20a is a four-input, four-output switch, designed to set up a path for light information whose polarizing direction is p-polarization.

These polarization control optical space switches 20a, 20b are selected from among the polarization control optical space switches described in the foregoing Embodiments 1 to 14.

Located on the input side of the polarization control switch block 20 is the birefringent plate 17, a polarization splitting means according to the present invention. The birefringent plate 17 transmits input light information in the rectilinear forward direction through to the p-polarization control optical space switch 20a when the polarizing direction of the light information is p-polarization, while directing input light information to a light path four paths upward for input into the s-polarization control optical space switch 20b when the polarizing direction of the light information is s-polarization. Arranged on the input side of the birefringent plate 17 is the polarization controller 16. The polarization controller 16 consists of four polarization control elements. The polarization control elements are arranged in the respective light paths #0–#3, each control element being designed to retain the polarizing direction of input light information or rotate it through $\pi/2$.

Located on the output side of the polarization control optical space switch block 20 is the birefringent plate 18 acting as a polarization correcting means. The birefringent plate 18 directs the s-polarized light, output from the s-polarization control optical space switch 20b, to a light path four paths downward for input into the polarization controller 19, while transmitting the p-polarized light, output from the p-polarization control optical space switch 20a, in the rectilinear forward direction through to the polarization controller 19.

The polarization controller 19 is located on the output side of the birefringent plate 18. Like, the polarization controller 16 on the input side, the polarization controller 19 works to retain the polarizing direction of input light information or rotate is through $\pi/2$, depending on voltage application. The polarization controller 19 consists of four polarization control elements corresponding to the output light paths #0–#3 respectively.

(Operation of the Space-division Optical Switching Network)

In the space-division optical switching network, p-polarized light incident along an i-th input light path first enters the polarization controller 16.

Depending on the presence or absence of voltage application, the polarization controller 16 allows the p-polarized light incident along the i-th light path to pass through it without change, or rotates the p-polarized light to convert it to s-polarized light for output.

When the p-polarized light is output from the polarization controller 16 without change, the p-polarized light is passed through the birefringent plate 17 in the rectilinear forward direction and enters the i-th input light path in the p-polarization control optical space switch 20a.

On the other hand, when the p-polarized light is rotated by the polarization controller 16 and output as s-polarized light, the s-polarized light entering the birefringent plate 17 is moved upward across it and coupled into a light path four paths upward. The s-polarized light thus enters the i-th light path #i in the s-polarization control optical space switch 20b.

The s-polarized light output from the i-th light path in the s-polarization control optical space switch 20b enters the birefringent plate 18.

In the birefringent plate 18, the s-polarized light is moved four light paths downward (to the i-th output light path) and coupled into the i-th light path #i in the polarization controller 19.

The polarization controller 19 rotates the s-polarized light to convert it into p-polarized light, which is output on the i-th output light path #i.

On the other hand, the p-polarized light output from the i-th light path in the p-polarization control optical space switch 20a is passed through the birefringent plate 18 in the rectilinear forward direction and enters the polarization controller 19. The polarization controller 19 outputs the p-polarized light without change onto the i-th output light path #i.

[Embodiment 16]

(Configuration of the Space-division Optical Switching Network)

Figure 23:
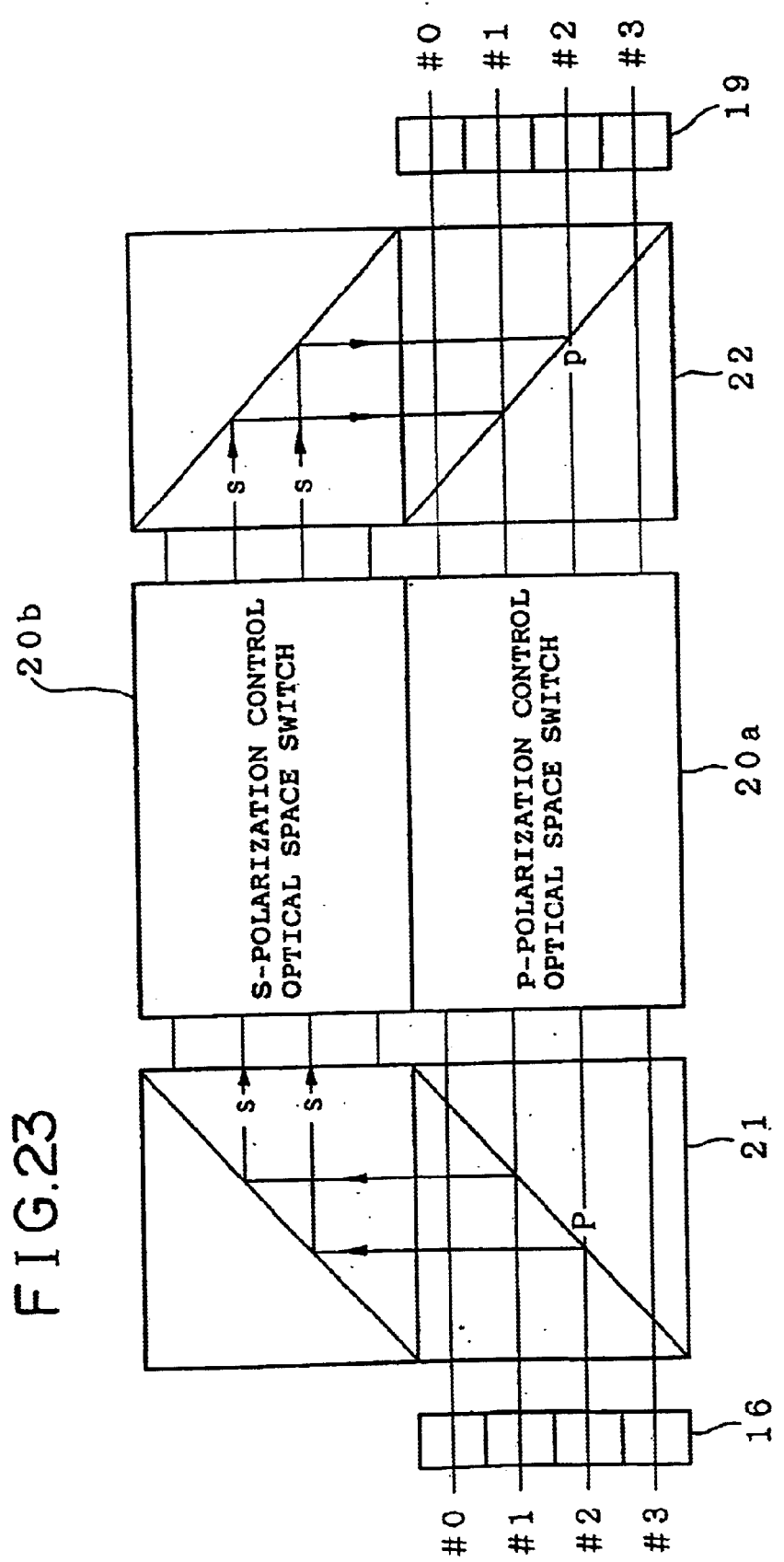
FIG. 23 is a diagram showing the configuration of a space-division optical switching network according to Embodiment 16.

FIG. 23 shows the configuration of a space-division optical switching network according to Embodiment 16.

This space-division optical switching network, as in the foregoing Embodiment 15, is an implementation of a four-input, four-output optical switching network. The space-division optical switching network comprises a polarization controller 16, a polarizing beam splitter array (PBS array) 21, a polarization control optical space switch block 20, a polarizing beam splitter array (PBS array) 22, and a polarization controller 19, coupled in cascade in this order from the input side.

The polarization controllers 16 and 19 are identical in configuration and function to those described in Embodiment 15.

Furthermore, the polarization control optical space switch block 20 is identical in function and configuration to the one described in Embodiment 15.

The polarizing beam splitter array (PBS array) 21 on the input side is a specific example of a polarization splitting means according to the present invention. This splitter array transmits input light information in the rectilinear forward direction through to the p-polarization control optical space switch 20a when the polarizing direction of the light information is p-polarization, while directing input light information to a light path four paths upward for input into the s-polarization control optical space switch 20b when the polarizing direction of the light information is s-polarization.

The polarizing beam splitter array (PBS array) 22 on the output side is a specific example of a polarization correcting means according to the present invention. This splitter array transmits the light information, output from the p-polarization control optical space switch 20a, in the rectilinear forward direction through to the polarization controller 19, while directing the light information, output from the s-polarization control optical space switch 20b, to a light path four paths downward for input into the polarization controller 19.

The operation of the space-division optical switching network of this embodiment is the same as that of Embodiment 15.

[Embodiment 17]

(Configuration of the Space-division Optical Switching Network)

Figure 24:
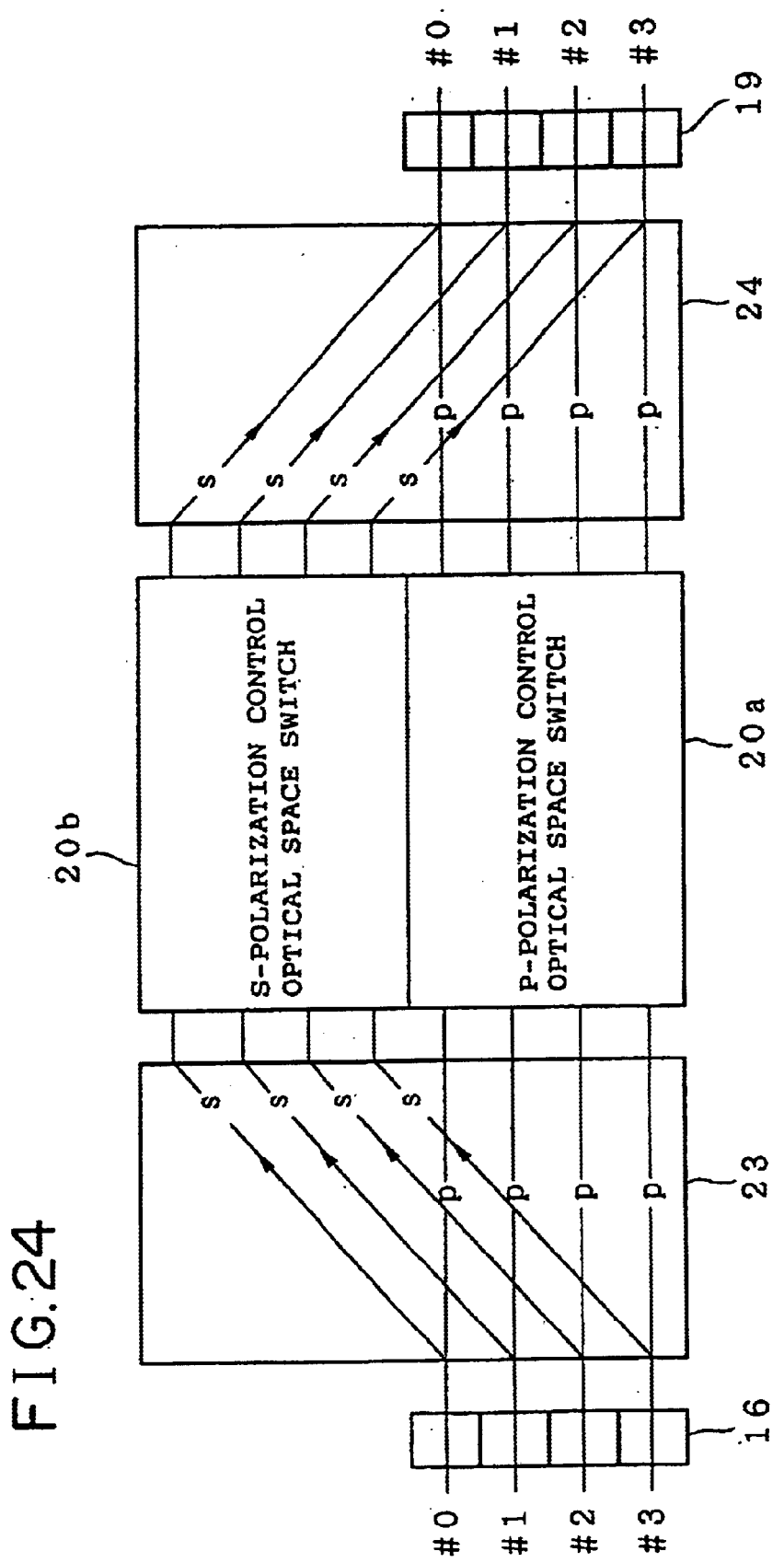
FIG. 24 is a diagram showing the configuration of a space-division optical switching network according to Embodiment 17.

FIG. 24 shows the configuration of a space-division optical switching network according to Embodiment 17.

This space-division optical switching network, as in Embodiment 15, is an implementation of a four-input, four-output optical switching network. The space-division optical switching network comprises a polarization controller 16, a liquid-crystal hologram 23, a polarization control optical space switch block 20, a liquid-crystal hologram 24, and a polarization controller 19, coupled in cascade in this order from the input side.

The polarization controllers 16 and 19 are identical in configuration and function to those described in Embodiment 15.

The polarization control optical space switch block 20 also is identical in function and configuration to the one described in Embodiment 15.

The liquid-crystal hologram 23 on the input side is a specific example of a polarization splitting means according to the present invention. This hologram 23 transmits input light information in the rectilinear forward direction through to the p-polarization control optical space switch 20a when the polarizing direction of the light information is p-polarization, while diffracting input light information toward a light path four paths upward for input into the s-polarization control optical space switch 20b when the polarizing direction of the light information is s-polarization.

The liquid-crystal hologram 24 on the output side is a specific example of a polarization correcting means according to the present invention. This hologram 24 transmits the light information, output from the p-polarization control optical space switch 20a, in the rectilinear forward direction through to the polarization controller 19, while diffracting the light information, output from the s-polarization control optical space switch 20b, toward a light path four paths downward for input into the polarization controller 19.

The operation of the space-division optical switching network of this embodiment is the same as that of Embodiment 15.

[Embodiment 18]

(Configuration of the Space-division Optical Switching Network)

Figure 25:
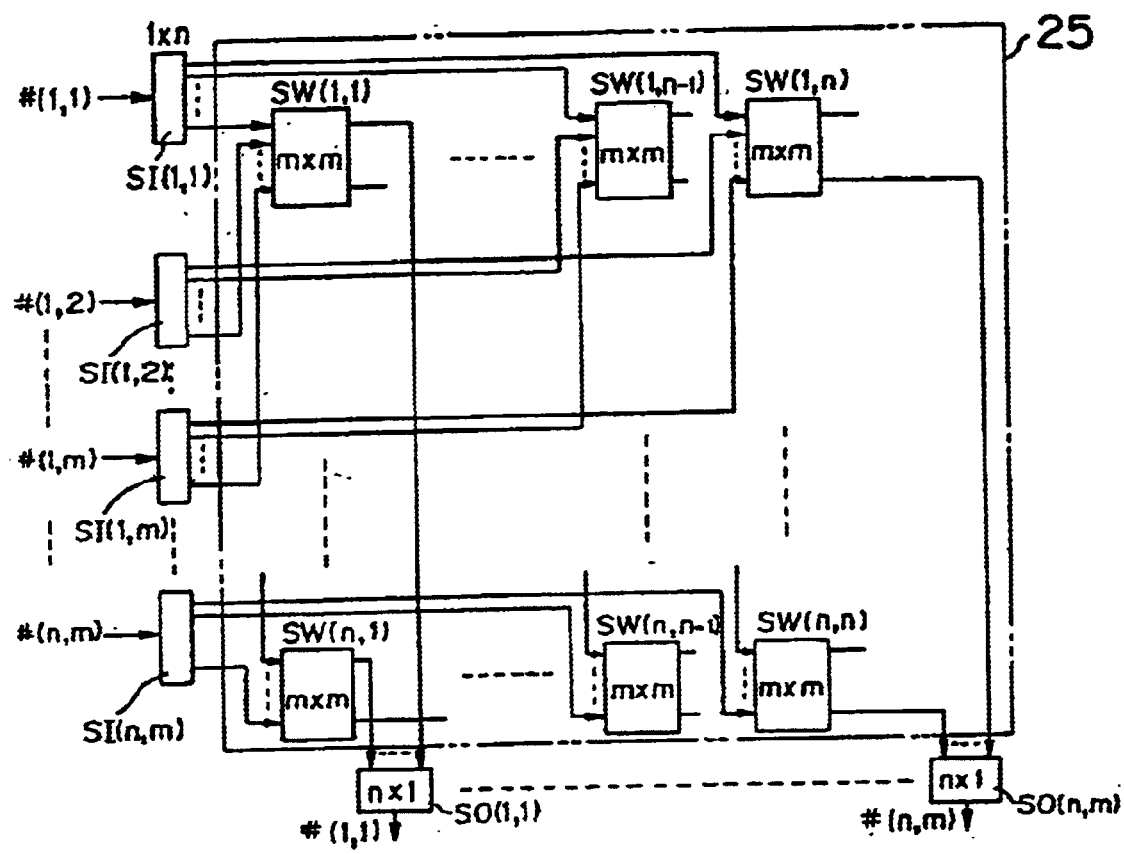
FIG. 25 is a diagram showing the configuration of a space-division optical switching network according to Embodiment 18.

FIG. 25 is a diagram showing the configuration of a space-division optical switching network according to Embodiment 18.

This space-division optical switching network comprises: a matrix switch array 25 consisting of m-input, m-output polarization control optical space switches, SW(1,1)–SW(n, n), arranged as a matrix of n×n; m×n (=N) optical switches, SI(1,1)–SI(n,m), arranged on the input side of the matrix switch array 25; and N optical switches, SO(1,1)–SO(n,m), arranged on the output side of the matrix switch array 25.

The polarization control optical space switches, SW(1,1) –SW(n,n), are selected from among the polarization control optical space switches described in Embodiments 1 to 14, and each switch has m input light paths and m output light paths.

The optical switches, SI(1,1)–SI(n,m), are each provided with one input and n outputs. These optical switches, SI(1, 1)–SI(n,m), are arranged in corresponding relationship to the N (n×m) input light paths to the matrix switch array 25.

On the other hand, the optical switches, SO(1,1)–SO(n, m), are each provided with n inputs and one output. These optical switches, SO(1,1)–SO(n,m), are arranged in corresponding relationship to the N (m×n) output light paths from the matrix switch array 25.

In this embodiment, the N (n×m) input light paths of the space-division optical switching network are divided into n groups of m input light paths. A j-th input light path in an i-th group is designated as #(i,j) (where $1 \leq i \leq n$, $1 \leq j \leq m$).

The n output light paths from an optical switch SI (i,j) corresponding to the input light path #(i,j) are connected to the j-th input light paths of n polarization control optical space switches, SW(i,1), SW(i,2), . . . , SW(i,n), arranged in the i-th row of the matrix switch array 25.

The N output light paths from the matrix switch array 25 are divided into n groups of m output light paths. An s-th output light path in an r-th group is designated as #(r,s) (where $1 \leq r \leq n$, $1 \leq s \leq m$).

The s-th outputs of polarization control optical space switches, SW(1,r), SW (2,r), . . . , SW(n,r), are connected to an optical switch SO (r,s) corresponding to the output light path #(r,s).

(Operation of the Space-division Optical Switching Network)

The operation of the above space-division optical switching network will be described below.

When light information input from the light path #(i,j) is to be output on the output light path #(r,s), an input signal from the optical switch SI (i,j) corresponding to the input light path #(i,j) is placed on the j-th input light path to each polarization control optical space switch SW (i,r).

Each polarization control optical space switch SW (i,r) switches the incident light information from the j-th light path to the s-th light path for output.

The light information output on the s-th light path of the polarization control optical space switch SW (i,r) is input into the optical switch SO (r,s).

Thus, the space-division optical switching network of Embodiment 18 is capable of achieving strictly nonblocking, N-input, N-output light path routing.

[Embodiment 19]

(Configuration of the Space-division Optical Switching Network)

Figure 26:
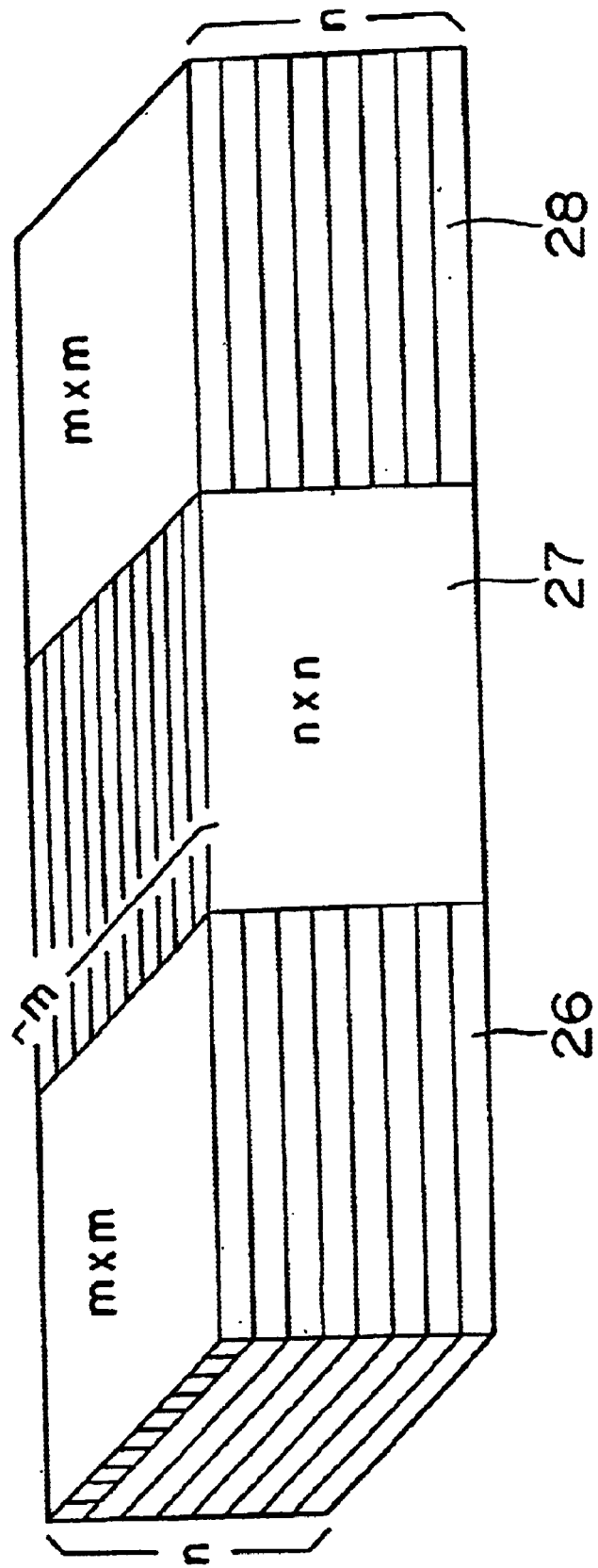
FIG. 26 is a diagram showing the configuration of a space-division optical switching network according to Embodiment 19.

FIG. 26 shows the configuration of a space-division optical switching network according to Embodiment 19.

This space-division optical switching network comprises: an N-input, N-output (N=m×n) polarization control optical space switch block 26 consisting of n layers of m-input, m-output polarization control optical space switches stacked one on top of another; an N-input, N-output (N=m×n) polarization control optical space switch block 27 consisting of m layers of n-input, n-output polarization control optical space switches; and an N-input, N-output (N=m×n) polarization control optical space switch block 28 consisting of n layers of m-input, m-output polarization control optical space switches, the switch blocks 26, 27, and 28 being coupled in cascade with one another.

The stacking direction in the polarization control optical space switch block 26 is made coincident with that in the polarization control optical space switch block 28, but perpendicular to that in the polarization control optical space switch block 27.

Figure 27:
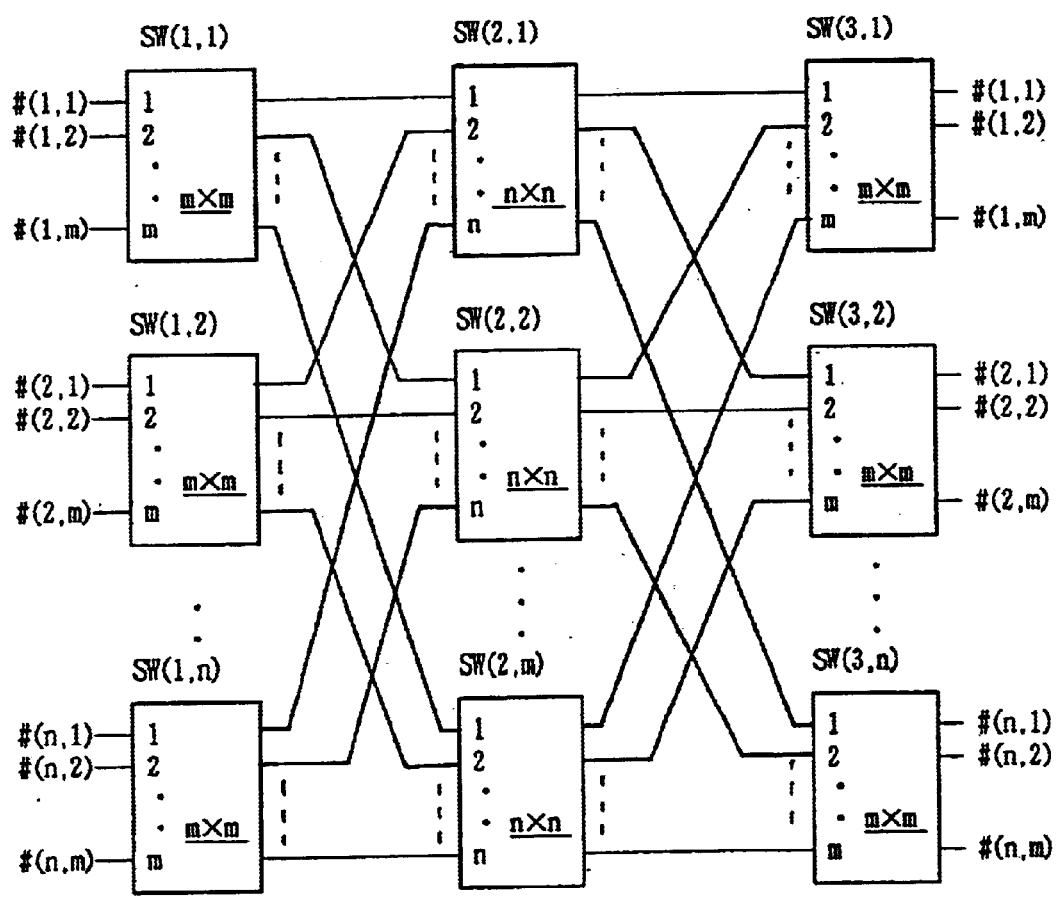
FIG. 27 is a diagram showing connections between switches in the space-division optical switching network.

FIG. 27 shows how the switch blocks are coupled with each other to construct a space-division optical switching network.

In the space-division optical switching network shown, the N (m×n) input light paths are divided into n groups of m input light paths. A j-th input light path in an i-th group is designated as #(i,j) (where 1≦i≦n, 1≦j≦m).

The input light path #(i,j) is connected to the j-th input light path of the polarization control optical space switch SW(1,i) located in the i-th row in the first-stage polarization control optical space switch block.

The j-th output of the polarization control optical space switch SW(1,i) in the i-th row in the first stage is coupled to the i-th input light path of the polarization control optical space switch (2,j) located in the j-th row in the second stage.

Further, the i-th output of the polarization control optical space switch (2,j) in the j-th row in the second stage is coupled to the j-th input light path of the polarization control optical space switch (2,i) located in the i-th row in the third stage.

Thus, according to the present embodiment, a space-division optical switching network having N inputs and N outputs (N=m×n) can be constructed using (2n+m) polarization control optical space switches.

[Embodiment 20]

(Configuration of the Space-division Optical Switching Network)

Figure 28:
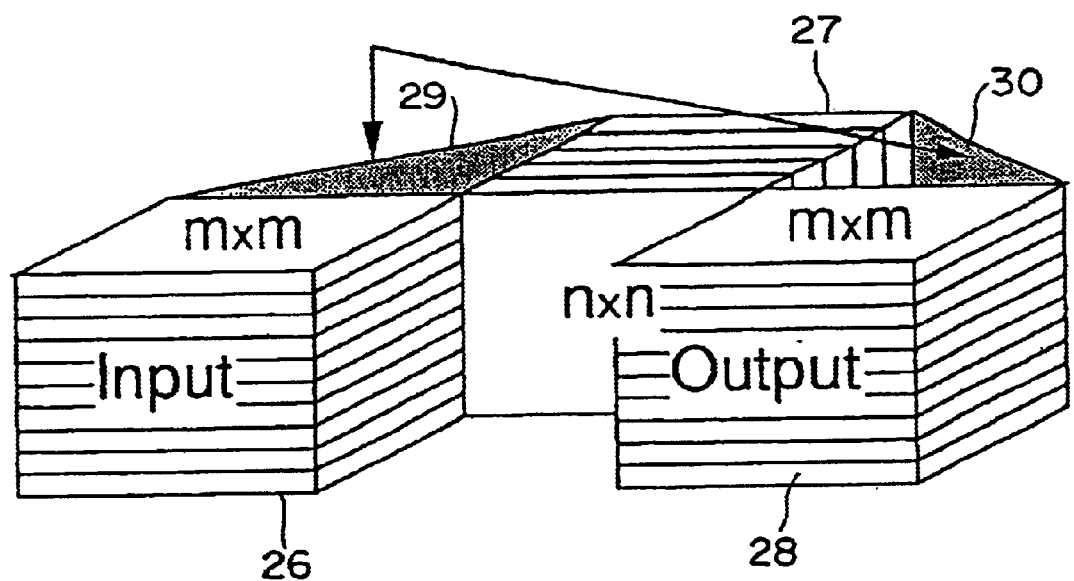
FIG. 28 is a diagram showing the configuration of a space-division optical switching network according to Embodiment 20.

FIG. 28 is a diagram showing the configuration of a space-division optical switching network according to Embodiment 20.

In comparison with the configuration of the foregoing Embodiment 19, the space-division optical switching network of Embodiment 20 comprises: a polarization control optical space switch block 26 consisting of n layers of m-input, m-output polarization control optical space switches stacked one on top of another; a polarization control optical space switch block 27 consisting of m layers of n-input, n-output polarization control optical space switches; a polarization control optical space switch block 28 consisting of m layers of m-input, m-output polarization control optical space switches; a reflection plate 29; and a reflection plate 30.

In this space-division optical switching network, the light paths of the polarization control optical space switch block 26 are arranged in a direction perpendicular to the light paths of the polarization control optical space switch block 27, which are then arranged in a direction perpendicular to the light paths of the polarization control optical space switch block 28.

The reflection plate 29 is located at a position where it makes an angle of 45° with the output light paths from the polarization control optical space switch block 26 as well as with the input light paths to the polarization control optical space switch block 27.

Similarly, the reflection plate 30 is located at a position where it makes an angle of 45° with the output light paths from the polarization control optical space switch block 27 as well as with the input light paths to the polarization control optical space switch block 28.

Light information output from the polarization control optical space switch block 26 strikes the reflection plate 29 at an incident angle of 45° and is reflected at a reflecting angle of 45°. Thus, the light information output from the polarization control optical space switch block 26 is deflected 90° by the reflection plate 29 and is input to the polarization control optical space switch block 27.

Similarly, the light information output from the polarization control optical space switch block 27 is deflected 90° by the reflection plate 30 and is input to the polarization control optical space switch block 26.

Thus, according to this embodiment, a space-division optical switching network of reduced length in the travelling direction of light information can be constructed.

[Embodiment 21]

(Configuration of the Space-division Optical Switching Network)

Figure 29:
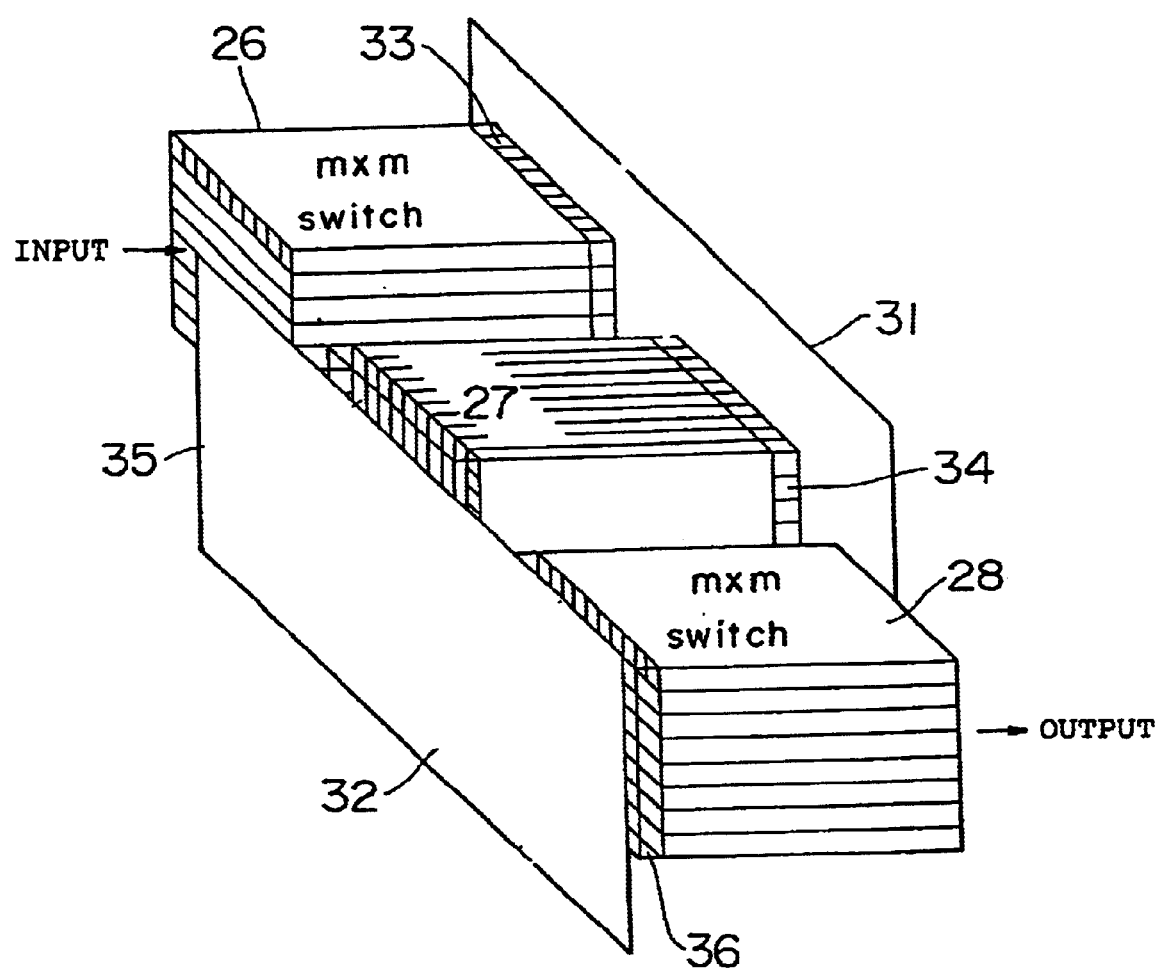
FIG. 29 is a diagram showing the configuration of a space-division optical switching network according to Embodiment 21.

FIG. 29 is a diagram showing the configuration of a space-division optical switching network according to Embodiment 21.

As in Embodiment 19, the space-division optical switching network of Embodiment 21 comprises: a polarization control optical space switch block 26 consisting of n layers of m-input, m-output polarization control optical space switches stacked one on top of another; a polarization control optical space switch block 27 consisting of m layers of n-input, n-output polarization control optical space switches; and a polarization control optical space switch block 28 consisting of n layers of m-input, m-output polarization control optical space switches. These polarization control optical space switch blocks 26, 27, and 28 are arranged so that the light paths in one switch block extend in parallel to the light paths in another switch block. Furthermore, the polarization control optical space switch blocks 26, 27, and 28 are arranged so that the direction of light propagation of the light paths in the polarization control optical space switch block 27 is opposite to that of the light paths in the polarization control optical space switch block 26 as well as to that of the light paths in the polarization control optical space switch block 28.

On the output surface of the polarization control optical space switch block 26, there is provided a hologram 33 for diffracting the light paths of light information.

A hologram 34 is provided on the input surface of the polarization control optical space switch block 27 on whose output surface is provided a hologram 35.

Further, a hologram 36 is provided on the input surface of the polarization control optical space switch block 28.

Furthermore, a reflection plate 31 is placed at a position facing the output surface of the polarization control optical space switch block 26 and the input surface of the polarization control optical space switch block 27. The reflection plate 31 is positioned perpendicularly to the light paths of the polarization control optical space switch blocks 26 and 27.

Similarly, a reflection plate 32 is placed at a position facing the output surface of the polarization control optical space switch block 27 and the input as surface of the polarization control optical space switch block 28. The reflection plate 32 is positioned perpendicularly to the light paths of the polarization control optical space switch blocks 27 and 28.

In this space-division optical switching network, light information output from the polarization control optical space switch block 26 is diffracted by the hologram 33 before striking the reflection plate 31.

The reflection plate 31 reflects the incident light information into the hologram 34.

The hologram 34 diffracts the incident light information for coupling into an appropriate input light path in the polarization control optical space switch block 27.

Next, the light information output from the polarization control optical space switch block 27 enters the hologram 35 provided on the output surface thereof.

The hologram 35 diffracts the light path of the incident light information which then strikes the reflection plate 32.

The reflection plate 32 reflects the incident light information into the hologram 36 provided on the input surface of the polarization control optical space switch block 28.

The hologram 36 diffracts the incident light information for coupling into an appropriate input light path in the polarization control optical space switch block 28.

Thus, Embodiment 21 permits the construction of an optical switching network of reduced length in the travelling direction of light information.

[Embodiment 22]

Figure 30:
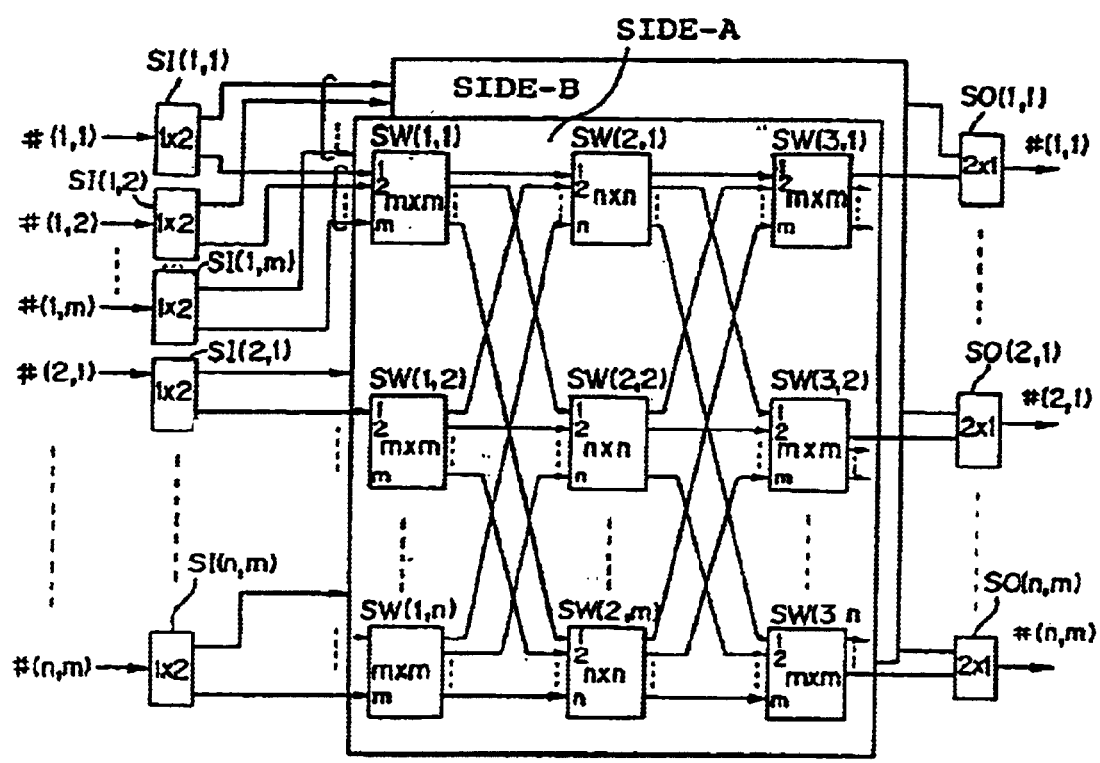
FIG. 30 is a diagram showing the configuration of a space-division optical switching network according to Embodiment 22.
Figure 31:
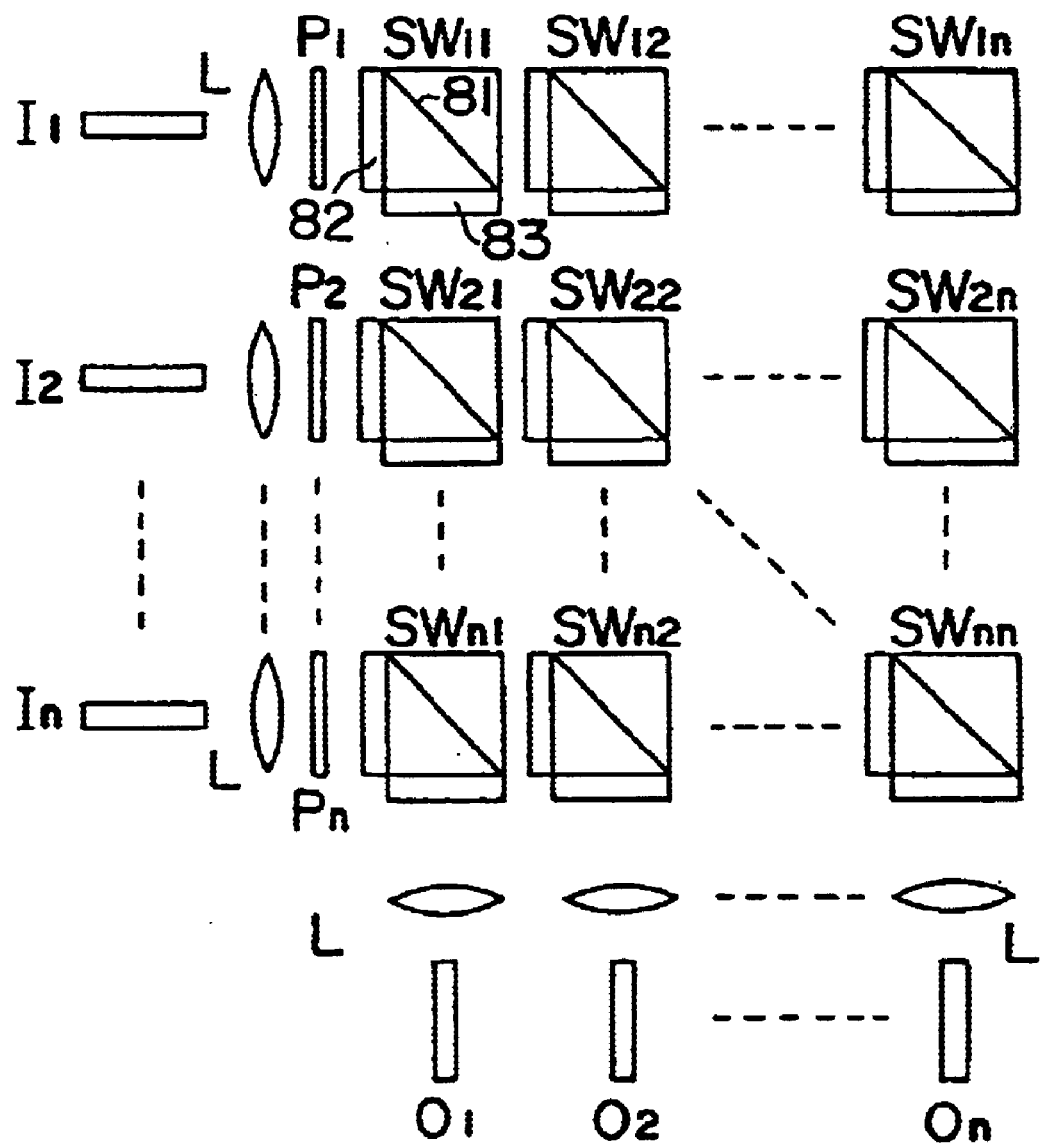
FIG. 31 is a diagram showing the basic configuration of a prior art polarization control optical space, switch.

FIG. 30 is a diagram showing the configuration of a space-division optical switching network according to Embodiment 22.

This space-division optical switching network comprises two switch matrices on different surfaces (surface A and surface B), each matrix consisting of a cascade chain comprising: an N-input, N-output (N=m×n) polarization control optical space switch block 26 consisting of n layers of m-input, m-output polarization control optical space switches stacked in a vertical direction; an N-input, N-output (N=m×n) polarization control optical space switch block 27 consisting of m layers of n-input, n-output polarization control optical space switches stacked in a horizontal direction; and an N-input, N-output (N=m×n) polarization control optical space switch block 28 consisting of n layers of m-input, m-output polarization control optical space switches stacked in a vertical direction. The space-division optical switching network further includes N optical switches, SI(1,1)–SI(n,m), each with one input and two outputs, for routing input between the two switch matrices. Furthermore, the space-division optical switching network includes N switches, SO(1,1)–SO(n,m), each with two inputs and one output, for routing the output between the switch matrix on surface A and the switch matrix on surface B.

The first output of each of the switches SI(1,1)–SI(n,m) is coupled to an input of surface A switch matrix, while the second output thereof is coupled to an input of surface B switch matrix.

The first input of each of the switches SO(1,1)–SI(n,m) is coupled to an output of surface A switch matrix, while the second input thereof is coupled to an output of surface B switch matrix.

In this embodiment, the N (m×n) input light paths of the space-division optical switching network are arranged in n groups of m input light paths. A j-th light path in an i-th group is designated as #(i,j) (where $1 \leq i \leq n$, $1 \leq j \leq m$).

The first output of a switch SI(i,j) located in the input light path #(i,j) is coupled to the j-th input light path of the switch SW(1,i) located in the i-th row in the polarization control optical space switch block 26 in the switch matrix on surface A.

An s-th output light path (where $1 \leq s \leq m$) of a switch SW(1,r) (where $1 \leq s \leq n$) located in the r-th row in the polarization control optical space switch block 26 is coupled to the r-th input light path of the switch SW(2,s) located in the s-th row in the polarization control optical space switch block 27.

Further, a v-th output light path (where $1 \leq v \leq n$) of a switch SW(2,u) (where $1 \leq u \leq m$) located in the u-th row in the polarization control optical space switch block 27 is coupled to the u-th input light path of the switch SW(3,v) located in the v-th row in the polarization control optical space switch block 28.

The second output of the switch SI(i,j) located in the input light path #(i,j) is coupled to the j-th input light path of the switch SW(1,i) located in the i-th row in the polarization control optical space switch block 26 in the switch matrix on surface B.

An s-th output light path (where $1 \leq s \leq m$) of a switch SW(1,r) (where $1 \leq r \leq n$) located in the r-th row in the polarization control optical space switch block 26 is coupled to the r-th input light path of the switch SW(2,s) located in the s-th row in the polarization control optical space switch block 27.

Further, a v-th output light path (where $1 \leq v \leq n$) of a switch SW(2,u) (where $1 \leq u \leq m$) located in the u-th row in the polarization control optical space switch block 27 is coupled to the u-th input light path of the switch SW(3,v) located in the v-th row in the polarization control optical space switch block 28.

The u-th output light path of a switch SW(3,v) on surface A is coupled to the first input of a switch SO(v,u).

The u-th output light path of a switch SW(3,v) on surface B is coupled to the second input of a switch SO(v,u).

What is claimed is:

1. A polarization control optical space switch comprising:
    a plurality of polarization control optical switches cascaded together;
        wherein each polarization control optical switch comprises:
        a first polarization controller that is capable of changing the polarization of light incident thereon by one of applying voltage thereto and not applying voltage thereto;
        a first element to change the optical path of light from said first polarization controller;
        a delay plate to change the polarization of light incident thereon from said first element; and
        a second element to change the optical path of light from said delay plate; and
    a final polarization control optical switch comprising:
        a second polarization controller that is capable of changing the polarization of light incident thereon by one of applying voltage thereto and not applying voltage thereto; and
        a third element to change the optical path of light from said second polarization controller,
        wherein said polarization control optical space switch has a plurality of inputs and the same number of outputs, and
        wherein switching light from one input to one output requires controlling only one of said first, second and third elements.

2. A polarization control optical space switch according to claim 1, wherein said delay plate includes segments that do not delay light incident thereon.

3. A polarization control optical space switch according to claim 1, wherein said first element to change the optical path of light from said first polarization controller and the second element to change the optical path of light from said delay plate only changes the optical path of p-polarized light.

4. A polarization control optical space switch according to claim 1, wherein said first element to change the optical path of light from said polarization controller and the second element to change the optical path of light from said delay plate only changes the optical path of s-polarized light.

5. A polarization control optical space switch according to claim 1, wherein said first element to change the optical path of light from said first polarization controller changes the optical path by moving light incident at an i-th input thereto to one of an (i−1)th and (i+1)th output.

6. A polarization control optical space switch according to claim 1, wherein said second element to change the optical path of light from said delay plate changes the optical path by moving light incident at an i-th input thereto to one of an (i−1)th and an (i+1)th output.

7. A polarization control optical space switch according to claim 1, wherein said first element to change the optical path of light from said first polarization controller is a downward polarizing beam splitter, which reflects incident light with a predetermined polarization input on the i-th input to an (i+1)th output.

8. A polarization control optical space switch according to claim 1, wherein said second element to change the optical path of light from said delay plate is an upward polarizing beam splitter, which reflects incident light with a predetermined polarization input on an i-th input to an (i−1)th output.

9. A polarization control optical space switch according to claim 1, wherein the first element to change the optical path of light from said first polarization controller is constructed from a polarizing beam splitter array consisting of a combination of polarizing beam splitters.

* * * * *